(12) United States Patent
Abousleman et al.

(10) Patent No.: US 7,339,881 B1
(45) Date of Patent: Mar. 4, 2008

(54) METHOD AND APPARATUS FOR ENCODING COMPRESSIBLE DATA FOR TRANSMISSION OVER VARIABLE QUALITY COMMUNICATION CHANNEL

(75) Inventors: Glen Patrick Abousleman, Scottsdale, AZ (US); John Eric Kleider, Scottsdale, AZ (US); Bruce Alan Fette, Mesa, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 952 days.

(21) Appl. No.: 10/437,422

(22) Filed: May 12, 2003

Related U.S. Application Data

(63) Continuation-in-part of application No. 10/417,942, filed on Apr. 18, 2003.

(51) Int. Cl.
　　*H04J 15/00* (2006.01)
　　*H04J 1/00* (2006.01)
　　*H04J 3/16* (2006.01)
　　*H04J 3/22* (2006.01)
　　*H04K 1/10* (2006.01)
　　*H04K 1/02* (2006.01)
　　*H04L 27/28* (2006.01)

(52) U.S. Cl. .................. 370/203; 370/343; 370/465; 370/480; 375/260; 375/296

(58) Field of Classification Search ............. 370/203, 370/343, 465, 480; 375/260, 296
See application file for complete search history.

(56) References Cited

U.S. PATENT DOCUMENTS 6,125,150 A　9/2000　Wesel et al.

6,154,489 A　11/2000　Kleider et al.

(Continued)

OTHER PUBLICATIONS

Glen P. Abousleman & John E. Kleider, "Robust Image Transmission Using Variable QoS Joint-Source-Modulation Coding", IEEE Signal Processing Society; Int'l Conference on Acoustics, Speech and Signal Processing, Orlando, Florida May 13, 2002.

(Continued)

*Primary Examiner*—Kevin C. Harper
(74) *Attorney, Agent, or Firm*—Lowell W. Gresham; Jordan M. Meschkow; Charlene R. Jacobsen

(57) ABSTRACT

A multi-carrier communication system (400) groups sub-channels (802) into different quality-of-signal (QoS) regions (804). An unconstrained optimization process (1200) is performed independently for the subchannels (802) of the different QoS regions (804) to allocate bit rates and power to the individual subchannels (802) so that the indicated QoS will result. Coders (504, 508, 512, 516, 1700) partition and error-correction encode source information using encoding schemes matched to the different QoS regions (804). A set (1100) of only a few directed QoS partition vectors (1102) direct the unconstrained optimization process (1200) to attempt bit-rate and power allocations on only a few promising groupings of subchannels (802) and QoS regions (804). An iterative process may take place between bit-rate and power allocation on one side and source information coding on the other for different directed QoS partition vectors (1102) to identify the best solution. A coder (1700) may use a dual allocation process (1800) to iteratively combine a rate-allocation process (1724) with a QoS-region-allocation process (1726) to specify codebooks (1720) for use by a codebook quantizer (1718).

22 Claims, 15 Drawing Sheets

U.S. PATENT DOCUMENTS

| | | | |
|---|---|---|---|
| 6,167,162 | A | 12/2000 | Jacquin et al. |
| 6,192,158 | B1 | 2/2001 | Abousleman |
| 6,278,701 | B1 | 8/2001 | Ayyagari et al. |
| 6,535,647 | B1 | 3/2003 | Abousleman |
| 6,539,122 | B1 | 3/2003 | Abousleman |
| 2002/0064173 | A1* | 5/2002 | Watanabe .................... 370/430 |
| 2002/0122383 | A1* | 9/2002 | Wu et al. .................... 370/210 |

OTHER PUBLICATIONS

S. Hu & A. Duel_Hallen, "Combined Adaptive Modulation and Transmitter Diveristy Using Long Range Prediction for Flat Fading Mobile Radion Channels", Proceedings of GCC 2001.

M. Souryal & R. Pickholtz, "Adaptive Modulation with Imperfect Channel Information", Proceedings of ICC 2001.

S. Ye., R.S. Blum, & L.J. Cimini, "Adaptive Modulation for Variable-Rate OFDM Systems with Imperfect Channel Information", Proceedings of UTC, 2002.

B.S. Krongold, K. Ramchandran & D.L. Jones, "Computationally Efficient Optimal Power Allocation Algorithms for Multicarrier Communication System" IEEE Transactions on Communications, vol. 48 No. 1 2000.

E. Ayanoglu & R.M. Gray,"The Design of Joint Source and Channel Trellis Waveform Coders" IEEE Transactions on Information Theory, vol. II-33 No. 6, Nov. 1987.

Andrea J. Goldsmith & Soon_Ghee Chua, "Variable-Rate Variable Power MQAM for Fading Channels" IEEE Transactions on Communications, vol. 45, No. 10, Oct. 1997.

G. Munz, S. Pfletschinger & J. Speidel "An Efficient Waterfilling Algorithm for Multiple Access OFDM", IEEE Telecommunications Conference 2002, Taipei, Taiwan.

M.R. Souryal & R.L. Pickholtz "Adaptive Modulation with Imperfect Channel Information in OFDM" 0-7803-7097-01/01, 2001 IEEE.

Tung-Sheng & Alexandra Duel_Hallen, "Adaptive Modulation Using Outdated Samples of Another Fading Channel" 0-7803-7376-6/02, 2002 IEEE.

H. Zheng, A. Raghupathy & K.J.R. Liu "A New Loading Algorithm for Image Transmitting Over Spectrally Shaped Channels; Combined Source Coding and Multicarrier Modulation Approach" 0-7803-5148-7/98, 1998 IEEE.

H. Zheng & K.J.R. Liu "Robust Image and Video Transmission Over Spectrally Shaped Channels Using Multicarrier Modulation", 1520-9210/99, 1999 IEEE.

L.M.C. Hoo, J. Tellado, & J.M. Cioffi Dual QoS Loading Algorithms for DMT Systems Offering CBR and VBR Service 0-7803-4984-9/98, 1998 IEEE.

H. Cheon, B. Park, & D. Hong, "Adaptive Multicarrier System with Reduced Feedback Information in WIdeband Radio Channels" 0-7803-5435-4/99, 1999 IEEE R.V. Sonalkar, J. Basso, & H. Sadjadpour, "A Novel Bit and Power Allocation Algorithm for Duplex Operation of DMT Based DSL Modems".

Detlev Marpe, Thomas Wiegand, and Hans L. Cycon Design of a Highly Efficient Wavelet-Based Video Coding Scheme Heinrich Hertz Institute (HHI), University of Applied Sciences (FHTW Berlin), to be Published in Proc. of SPIE vol. 4671.

* cited by examiner

| β PHYSICAL CHANNEL ALLOCATION TABLE |||||| 
|---|---|---|---|---|---|
| RATE | $QoS_1$ | $QoS_2$ | $QoS_3$ | $QoS_4$ | $QoS_5$ |
| 1 | 1.6852 | 0.4910 | 0.3340 | 0.1921 | 0.1468 |
| 2 | 0.6276 | 0.1594 | 0.0942 | 0.0577 | 0.0462 |
| 3 | 0.4233 | 0.1053 | 0.0558 | 0.0382 | 0.0288 |
| 4 | 0.2247 | 0.0441 | 0.0231 | 0.0147 | 0.0101 |
| 5 | 0.2097 | 0.0295 | 0.0148 | 0.0094 | 0.0074 |
| 6 | 0.0743 | 0.0120 | 0.0063 | 0.0040 | 0.0029 |
| 7 | 0.0694 | 0.0080 | 0.0038 | 0.0026 | 0.0018 |
| 8 | 0.0247 | 0.0033 | 0.0016 | 0.0010 | 0.0006 |
| 9 | 0.0207 | 0.0021 | 0.0010 | 0.0007 | 0.0005 |
| 10 | 0.0088 | 0.0009 | 0.0004 | 0.0003 | 0.0002 |

FIG. 9

| RATE-SNR PHYSICAL ALLOCATION TABLE |||||| 
|---|---|---|---|---|---|
| RATE | $QoS_1$ | $QoS_2$ | $QoS_3$ | $QoS_4$ | $QoS_5$ |
| 1 | -1.0 | 4.2 | 7.6 | 8.3 | 9.7 |
| 2 | 2.0 | 7.3 | 9.8 | 11.4 | 12.6 |
| 3 | 6.0 | 11.8 | 14.3 | 16.2 | 17.2 |
| 4 | 8.0 | 13.9 | 16.6 | 18.2 | 19.4 |
| 5 | 11.1 | 17.8 | 20.6 | 22.5 | 24.0 |
| 6 | 12.0 | 19.7 | 22.6 | 24.5 | 25.5 |
| 7 | 16.0 | 23.6 | 26.4 | 28.3 | 29.73 |
| 8 | 16.5 | 25.3 | 28.5 | 30.3 | 31.6 |
| 9 | 20.8 | 29.2 | 32.3 | 34.3 | 36.2 |
| 10 | 21.5 | 31.2 | 34.2 | 36.2 | 37.5 |

FIG. 10

| # | Vector | # | Vector | # | Vector |
|---|---|---|---|---|---|
| 1: | $\begin{bmatrix} 64, & 64, & 64, & 64 \\ 10^{-2}, & 10^{-3}, & 10^{-4}, & 10^{-5} \end{bmatrix}$ | 23: | $\begin{bmatrix} 85, & 85, & 86, & 0 \\ 10^{-1}, & 10^{-2}, & 10^{-3}, & 0 \end{bmatrix}$ | 45: | $\begin{bmatrix} 160, & 96, & 0, & 0 \\ 10^{-2}, & 10^{-5}, & 0, & 0 \end{bmatrix}$ |
| 2: | $\begin{bmatrix} 32, & 96, & 96, & 32 \\ 10^{-2}, & 10^{-3}, & 10^{-4}, & 10^{-5} \end{bmatrix}$ | 24: | $\begin{bmatrix} 32, & 96, & 128, & 0 \\ 10^{-1}, & 10^{-2}, & 10^{-3}, & 0 \end{bmatrix}$ | 46: | $\begin{bmatrix} 32, & 224, & 0, & 0 \\ 10^{-2}, & 10^{-5}, & 0, & 0 \end{bmatrix}$ |
| 3: | $\begin{bmatrix} 32, & 32, & 96, & 96 \\ 10^{-2}, & 10^{-3}, & 10^{-4}, & 10^{-5} \end{bmatrix}$ | 25: | $\begin{bmatrix} 64, & 64, & 128, & 0 \\ 10^{-1}, & 10^{-2}, & 10^{-3}, & 0 \end{bmatrix}$ | 47: | $\begin{bmatrix} 224, & 32, & 0, & 0 \\ 10^{-2}, & 10^{-5}, & 0, & 0 \end{bmatrix}$ |
| 4: | $\begin{bmatrix} 32, & 128, & 64, & 32 \\ 10^{-2}, & 10^{-3}, & 10^{-4}, & 10^{-5} \end{bmatrix}$ | 26: | $\begin{bmatrix} 64, & 128, & 64, & 0 \\ 10^{-1}, & 10^{-2}, & 10^{-3}, & 0 \end{bmatrix}$ | 48: | $\begin{bmatrix} 128, & 128, & 0, & 0 \\ 10^{-3}, & 10^{-4}, & 0, & 0 \end{bmatrix}$ |
| 5: | $\begin{bmatrix} 32, & 64, & 128, & 32 \\ 10^{-2}, & 10^{-3}, & 10^{-4}, & 10^{-5} \end{bmatrix}$ | 27: | $\begin{bmatrix} 128, & 128, & 0, & 0 \\ 10^{-4}, & 10^{-5}, & 0, & 0 \end{bmatrix}$ | 49: | $\begin{bmatrix} 64, & 192, & 0, & 0 \\ 10^{-3}, & 10^{-4}, & 0, & 0 \end{bmatrix}$ |
| 6: | $\begin{bmatrix} 32, & 32, & 64, & 128 \\ 10^{-2}, & 10^{-3}, & 10^{-4}, & 10^{-5} \end{bmatrix}$ | 28: | $\begin{bmatrix} 64, & 192, & 0, & 0 \\ 10^{-4}, & 10^{-5}, & 0, & 0 \end{bmatrix}$ | 50: | $\begin{bmatrix} 192, & 64, & 0, & 0 \\ 10^{-3}, & 10^{-4}, & 0, & 0 \end{bmatrix}$ |
| 7: | $\begin{bmatrix} 32, & 32, & 128, & 64 \\ 10^{-2}, & 10^{-3}, & 10^{-4}, & 10^{-5} \end{bmatrix}$ | 29: | $\begin{bmatrix} 192, & 64, & 0, & 0 \\ 10^{-4}, & 10^{-5}, & 0, & 0 \end{bmatrix}$ | 51: | $\begin{bmatrix} 96, & 160, & 0, & 0 \\ 10^{-3}, & 10^{-4}, & 0, & 0 \end{bmatrix}$ |
| 8: | $\begin{bmatrix} 64, & 64, & 64, & 64 \\ 10^{-1}, & 10^{-2}, & 10^{-3}, & 10^{-4} \end{bmatrix}$ | 30: | $\begin{bmatrix} 96, & 160, & 0, & 0 \\ 10^{-4}, & 10^{-5}, & 0, & 0 \end{bmatrix}$ | 52: | $\begin{bmatrix} 160, & 96, & 0, & 0 \\ 10^{-3}, & 10^{-4}, & 0, & 0 \end{bmatrix}$ |
| 9: | $\begin{bmatrix} 32, & 96, & 96, & 32 \\ 10^{-1}, & 10^{-2}, & 10^{-3}, & 10^{-4} \end{bmatrix}$ | 31: | $\begin{bmatrix} 160, & 96, & 0, & 0 \\ 10^{-4}, & 10^{-5}, & 0, & 0 \end{bmatrix}$ | 53: | $\begin{bmatrix} 32, & 224, & 0, & 0 \\ 10^{-3}, & 10^{-4}, & 0, & 0 \end{bmatrix}$ |
| 10: | $\begin{bmatrix} 32, & 32, & 96, & 96 \\ 10^{-1}, & 10^{-2}, & 10^{-3}, & 10^{-4} \end{bmatrix}$ | 32: | $\begin{bmatrix} 32, & 224, & 0, & 0 \\ 10^{-4}, & 10^{-5}, & 0, & 0 \end{bmatrix}$ | 54: | $\begin{bmatrix} 224, & 32, & 0, & 0 \\ 10^{-3}, & 10^{-4}, & 0, & 0 \end{bmatrix}$ |
| 11: | $\begin{bmatrix} 32, & 128, & 64, & 32 \\ 10^{-1}, & 10^{-2}, & 10^{-3}, & 10^{-4} \end{bmatrix}$ | 33: | $\begin{bmatrix} 224, & 32, & 0, & 0 \\ 10^{-4}, & 10^{-5}, & 0, & 0 \end{bmatrix}$ | 55: | $\begin{bmatrix} 128, & 128, & 0, & 0 \\ 10^{-2}, & 10^{-4}, & 0, & 0 \end{bmatrix}$ |
| 12: | $\begin{bmatrix} 32, & 64, & 128, & 32 \\ 10^{-1}, & 10^{-2}, & 10^{-3}, & 10^{-4} \end{bmatrix}$ | 34: | $\begin{bmatrix} 128, & 128, & 0, & 0 \\ 10^{-3}, & 10^{-5}, & 0, & 0 \end{bmatrix}$ | 56: | $\begin{bmatrix} 64, & 192, & 0, & 0 \\ 10^{-2}, & 10^{-4}, & 0, & 0 \end{bmatrix}$ |
| 13: | $\begin{bmatrix} 32, & 32, & 64, & 128 \\ 10^{-1}, & 10^{-2}, & 10^{-3}, & 10^{-4} \end{bmatrix}$ | 35: | $\begin{bmatrix} 64, & 192, & 0, & 0 \\ 10^{-3}, & 10^{-5}, & 0, & 0 \end{bmatrix}$ | 57: | $\begin{bmatrix} 192, & 64, & 0, & 0 \\ 10^{-2}, & 10^{-4}, & 0, & 0 \end{bmatrix}$ |
| 14: | $\begin{bmatrix} 32, & 32, & 128, & 64 \\ 10^{-1}, & 10^{-2}, & 10^{-3}, & 10^{-4} \end{bmatrix}$ | 36: | $\begin{bmatrix} 192, & 64, & 0, & 0 \\ 10^{-3}, & 10^{-5}, & 0, & 0 \end{bmatrix}$ | 58: | $\begin{bmatrix} 96, & 160, & 0, & 0 \\ 10^{-2}, & 10^{-4}, & 0, & 0 \end{bmatrix}$ |
| 15: | $\begin{bmatrix} 85, & 85, & 86, & 0 \\ 10^{-3}, & 10^{-4}, & 10^{-5}, & 0 \end{bmatrix}$ | 37: | $\begin{bmatrix} 96, & 160, & 0, & 0 \\ 10^{-3}, & 10^{-5}, & 0, & 0 \end{bmatrix}$ | 59: | $\begin{bmatrix} 160, & 96, & 0, & 0 \\ 10^{-2}, & 10^{-4}, & 0, & 0 \end{bmatrix}$ |
| 16: | $\begin{bmatrix} 32, & 96, & 128, & 0 \\ 10^{-3}, & 10^{-4}, & 10^{-5}, & 0 \end{bmatrix}$ | 38: | $\begin{bmatrix} 160, & 96, & 0, & 0 \\ 10^{-3}, & 10^{-5}, & 0, & 0 \end{bmatrix}$ | 60: | $\begin{bmatrix} 32, & 224, & 0, & 0 \\ 10^{-2}, & 10^{-4}, & 0, & 0 \end{bmatrix}$ |
| 17: | $\begin{bmatrix} 64, & 64, & 128, & 0 \\ 10^{-3}, & 10^{-4}, & 10^{-5}, & 0 \end{bmatrix}$ | 39: | $\begin{bmatrix} 32, & 224, & 0, & 0 \\ 10^{-3}, & 10^{-5}, & 0, & 0 \end{bmatrix}$ | 61: | $\begin{bmatrix} 224, & 32, & 0, & 0 \\ 10^{-2}, & 10^{-4}, & 0, & 0 \end{bmatrix}$ |
| 18: | $\begin{bmatrix} 64, & 128, & 64, & 0 \\ 10^{-3}, & 10^{-4}, & 10^{-5}, & 0 \end{bmatrix}$ | 40: | $\begin{bmatrix} 224, & 32, & 0, & 0 \\ 10^{-3}, & 10^{-5}, & 0, & 0 \end{bmatrix}$ | 62: | $\begin{bmatrix} 256, & 0, & 0, & 0 \\ 10^{-5}, & 0, & 0, & 0 \end{bmatrix}$ |
| 19: | $\begin{bmatrix} 85, & 85, & 86, & 0 \\ 10^{-2}, & 10^{-3}, & 10^{-4}, & 0 \end{bmatrix}$ | 41: | $\begin{bmatrix} 128, & 128, & 0, & 0 \\ 10^{-2}, & 10^{-5}, & 0, & 0 \end{bmatrix}$ | 63: | $\begin{bmatrix} 256, & 0, & 0, & 0 \\ 10^{-4}, & 0, & 0, & 0 \end{bmatrix}$ |
| 20: | $\begin{bmatrix} 32, & 96, & 128, & 0 \\ 10^{-2}, & 10^{-3}, & 10^{-4}, & 0 \end{bmatrix}$ | 42: | $\begin{bmatrix} 64, & 192, & 0, & 0 \\ 10^{-2}, & 10^{-5}, & 0, & 0 \end{bmatrix}$ | 64: | $\begin{bmatrix} 256, & 0, & 0, & 0 \\ 10^{-3}, & 0, & 0, & 0 \end{bmatrix}$ |
| 21: | $\begin{bmatrix} 64, & 64, & 128, & 0 \\ 10^{-2}, & 10^{-3}, & 10^{-4}, & 0 \end{bmatrix}$ | 43: | $\begin{bmatrix} 192, & 64, & 0, & 0 \\ 10^{-2}, & 10^{-5}, & 0, & 0 \end{bmatrix}$ | 65: | $\begin{bmatrix} 256, & 0, & 0, & 0 \\ 10^{-2}, & 0, & 0, & 0 \end{bmatrix}$ |
| 22: | $\begin{bmatrix} 64, & 128, & 64, & 0 \\ 10^{-2}, & 10^{-3}, & 10^{-4}, & 0 \end{bmatrix}$ | 44: | $\begin{bmatrix} 96, & 160, & 0, & 0 \\ 10^{-2}, & 10^{-5}, & 0, & 0 \end{bmatrix}$ | 66: | $\begin{bmatrix} 256, & 0, & 0, & 0 \\ 10^{-1}, & 0, & 0, & 0 \end{bmatrix}$ |

FIG. 15 1500

METHOD AND APPARATUS FOR ENCODING COMPRESSIBLE DATA FOR TRANSMISSION OVER VARIABLE QUALITY COMMUNICATION CHANNEL

RELATED INVENTIONS

The present invention is a Continuation-In-Part of "Multi-Carrier Modulation with Source Information Allocated Over Variable Quality Communication Channel," Ser. No. 10/417,942, filed Apr. 18, 2003 which is incorporated herein by reference.

GOVERNMENT RIGHTS

This invention was made with Government support under DAAD19-01-2-0011 awarded by the Army. The Government has certain rights in this invention.

TECHNICAL FIELD OF THE INVENTION

The present invention relates generally to the field of communications. More specifically, the present invention relates to multi-carrier modulation, to allocating bit rates and power to subchannels, and to concurrently modulating and error-correction encoding at a plurality of quality-of-signal levels.

BACKGROUND OF THE INVENTION

Communication systems seek to communicate as much information as possible in as little time as possible using as little power as possible and over as small of a bandwidth as possible. A wide variety of data compression, error correction, and modulation techniques have been developed to further this goal.

Data compression re-characterizes an original data set using less data than was included in the original data set but in a manner that allows as much accuracy as possible in reconstruction of the original data. Data compression is often employed on human-perceivable data, such as video, imagery, or audio, that typically include a large amount of redundant content which the compression removes and which need not be perfectly reconstructed. If the original data set represents video, imagery, or audio, tremendous amounts of compression can be achieved while still having the reconstructed video, image, or audio be readily perceivable. Other types of data sets, such as computer data, may also be reduced by compression. But compression algorithms that insure a perfect reconstruction are typically employed with such data sets. A lesser, but still significant, amount of compression can often be achieved.

Compression and reconstruction are highly desirable in communication systems because a much smaller quantity of compressed data needs to be transmitted through a communication channel than would be required to transmit the original data set. But a problem with compressed data is that it can become more vulnerable to communication errors.

Error-correction encoding, hereinafter referred to as error-correction (EC) coding, is the process of transforming the information sequence into an EC coded sequence. This is performed by adding structure or redundancy to the data bit stream so that the degradation caused by signal distortion which occurs during the transmission over the wireless channel or any propagation medium (wired or wireless) between the transmitter and receiver can be mitigated at the receiver and allow reliable data recovery. The EC coding process can utilize convolutional-, block-, turbo-coding, or any suitable means deemed appropriate for reliable data recovery. EC coding requires a greater quantity of data to be communicated through a channel than would be required if EC coding were omitted. To this extent, EC coding is undesirable and works at cross purposes to compression. But relatively small amounts of EC coding introduce coding gain that can more than offset the cost of transmitting additional redundant data. In general, EC coding maintains at least a minimum bit error rate while channel conditions deteriorate. However, when channel conditions deteriorate to some point, the coding utterly fails and massive increases in bit errors pass through an EC decoder. Generally, greater amounts of embedded redundant information lead to higher quality received data because more information is available with which to detect and correct errors.

Modulation refers to applying to-be-communicated data, whether or not compressed and/or EC coded, to signals which are then imposed on a physical channel (e.g., RF, cable, optical) through which the data are to be communicated. These signals are configured in power and bandwidth to accommodate the attributes and requirements of the physical channel. Moreover, modulation formats, such as CDMA, M-QAM and the like and rates delivered thereby are also configured to match the physical channel.

Conventional modulators manipulate power and rate to achieve a desired quality of signal. Typically, at a given quality of signal and for a given channel, an increase in power will permit communication of data at a greater rate or a decrease in rate will permit the use of less power. Likewise, at a given power for a given channel, an increase in rate dictates a decrease in quality, or a decrease in rate permits an increase in quality. Or, at a given rate for a given channel, an increase in power permits an increase in quality, or a decrease in power dictates a decrease in quality.

FIG. 1 shows a block diagram of a generic conventional communication system that employs compression, EC coding, and modulation. At an innermost level, a modulator (mod) 100 and a demodulator (demod) 102 perform complementary operations with respect to a physical channel 104. The characteristics of physical channel 104 influence the quality at which data may be conveyed. The modulator 100, demodulator 102, and physical channel 104 together provide a logical intermediate channel 106 with conveyance quality characteristics that may have been transformed from those of physical channel 104. Typically, modulator 100 is configured so that logical intermediate channel 106 appears to convey data at a fixed signal quality, with power and rate being adjusted as needed to accomplish the prescribed signal quality. An EC coding block 108 and an EC decoding block 110 perform complementary operations with respect to logical intermediate channel 106. Typically, EC coding block 108 is configured to implement an encoding scheme for the prescribed quality presented to it by logical intermediate channel 106 and so that a much improved signal quality is presented through a logical outer channel 112. A compression block 114 and a decompression block 116 are then configured to operate in an environment where their output is passed through the logical outer channel 112 at this much improved signal quality.

In some robust video and image coding schemes, the compression and EC coding functions are integrated or jointly matched to the fixed quality channel presented to them by logical intermediate channel 106. The result is typically an improvement in efficiency in combination with improvements in the way degradation occurs as errors increase.

FIG. 2 depicts relationships between different coding schemes, received quality of source information communicated through a channel, and channel quality, assuming other factors remain constant. Generally, a good quality channel allows a weak coding scheme to embed less redundant information with the source data and therefore achieve a higher source data rate than would be achieved using a strong coding scheme. Referring back to FIG. 1, EC coding block 108, or EC coding block 108 jointly matched with compression block 114, should implement the single EC coding scheme that achieves the highest received quality and rate for the channel quality presented to it by logical intermediate channel 106.

While the conventional approach discussed above works well for narrowband channels, problems result when this approach is applied in wideband channels, such as those often used in connection with multi-carrier (MC) modulation, multi-tone modulation, OFDM, DSL, and the like. FIG. 3 depicts two examples of the complex channel gain possible in a wideband physical channel 104 without any transmission from modulator 100. In FIG. 3, the solid line represents frequency-selective fading, and the dotted line represents an interfering or jamming signal. Different ones of the subchannels that make up wideband physical channel 102 have different abilities to convey data due to this channel gain. Conventional techniques call for modulating data into each subchannel so that each subchannel delivers data at substantially the same quality as the other subchannels.

Unfortunately, this conventional technique uses resources inefficiently. Transforming low quality subchannels that have low channel-gain-to-noise ratios (CGNRs) into medium quality data conveyors requires the expenditure of excessive amounts of power or a costly decrease in source rate. And, transforming high quality subchannels that have high CGNRs into only medium quality data conveyors saves little power or produces little rate improvement. Moreover, the transforming of a range of conveyance quality demonstrated by a wideband physical channel 104 into a single-conveyance-quality logical intermediate channel 106 causes coding to be applied inefficiently. The variation in quality of subchannels within physical channel 104 is not corrected, but merely transformed to a constant, at logical intermediate channel 106. As demonstrated by the shaded area in FIG. 2, higher received quality, and often a higher source rate, result from using a variety of coding schemes when facing a range of conveyance qualities when compared to using a single encoding scheme.

SUMMARY OF THE INVENTION

It is an advantage of the present invention that an improved method and apparatus for encoding compressible data for transmission over a variable quality communication channel are provided.

Another advantage is that the apparatus and method of the invention as configured in the preferred embodiments employ an unconstrained multi-carrier (MC) allocation algorithm so that the allocation problem is tractable.

Another advantage is that the apparatus and method of the invention as configured in the preferred embodiments compress and encode data for application to a communication channel in which subchannels have been grouped together into more than one quality-of-signal (QoS) region, where each QoS region exhibits a unique bit-error-rate.

The above and other advantages are realized in one form by a method of encoding compressible data for transmission through a communication channel. The method calls for transforming a block of the compressible data into K data sections, where K is an integer greater than two. A number F of different bit-error-rates associated with F quality-of-signal (QoS) regions of the communication channel is identified, where F is an integer greater than one. Each of the F QoS regions is associated with at least one of the K data sections. Each of the K data sections is converted into codes using a codebook configured for the bit-error-rate associated with the data section.

The above and other advantages are realized in another form by a method of allocating compressible data to subchannels in a transmitter which employs multi-carrier modulation. In this form, the method calls for obtaining channel state information for a communication channel that includes a plurality of subchannels. The channel state information indicates deviation in channel-gain-to-noise ratio (CGNR) throughout the communication channel. The subchannels are grouped together into a number F of quality-of-signal (QoS) regions in response to the channel state information. Each of the F QoS regions has a unique bit-error-rate associated therewith. A block of the compressible data is transformed into K data sections, where K is an integer greater than two. Each of the F QoS regions is associated with at least one of said K data sections. The data sections associated with each of the F QoS regions are converted into codes using a codebook configured for the bit-error-rate associated with the QoS region so that each code is configured for one of the unique bit-error-rates. For each of these codes converted from the K data sections, the method then modulates the code into one of said subchannels from the QoS region having the unique bit-error-rate for which said code is configured.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIGS. 9 and 10 show examples of first and second physical channel allocation tables used in connection with the process of FIG. 7;

FIG. 15 shows a block diagram of a population of QoS partition vectors from which the directed QoS partition vector set is selected;

DETAILED DESCRIPTION OF PREFERRED EMBODIMENTS

Figure 1:
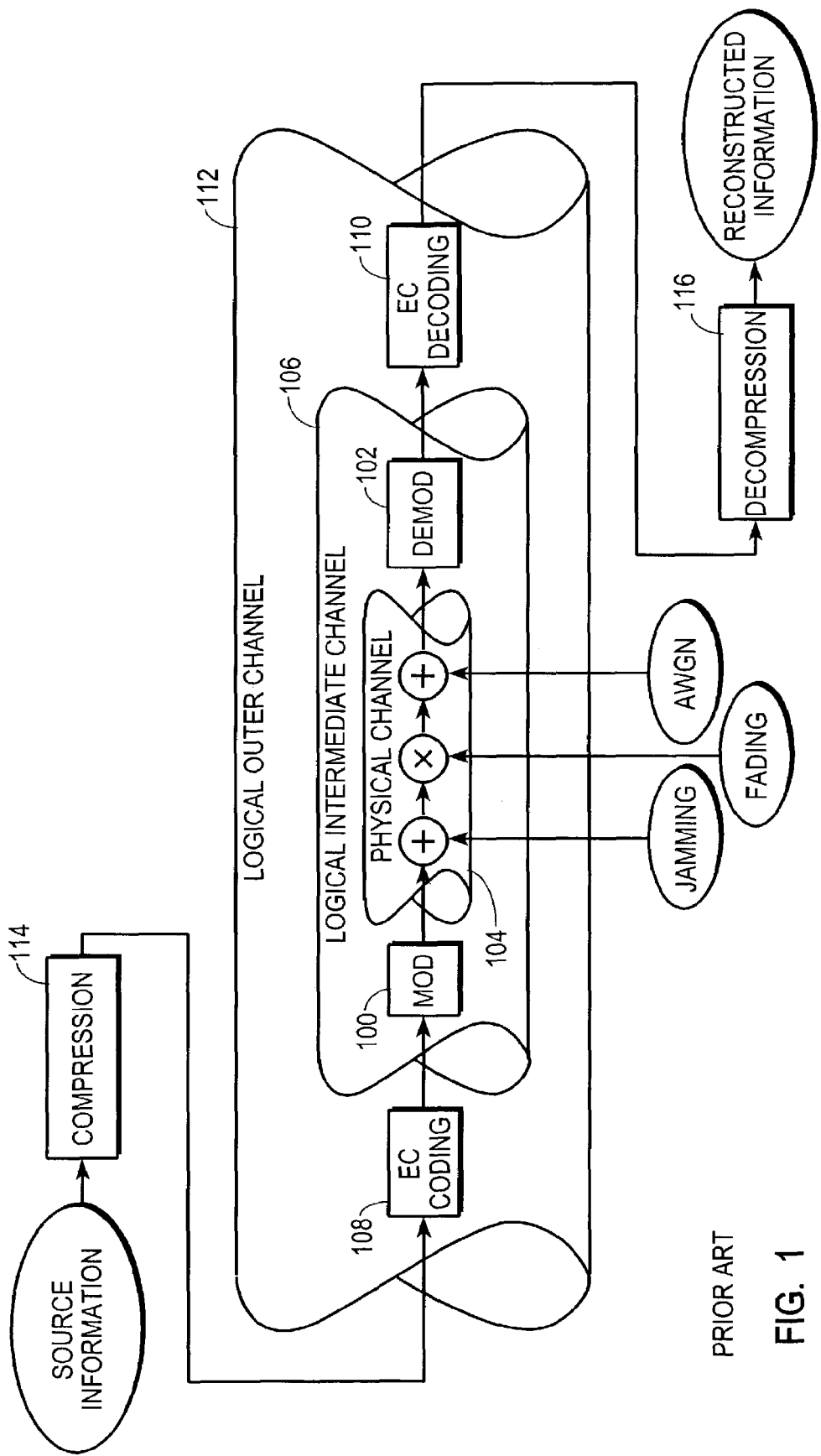
FIG. 1 shows a block diagram of a generic prior art communication system that employs compression, EC coding, and modulation.
Figure 2:
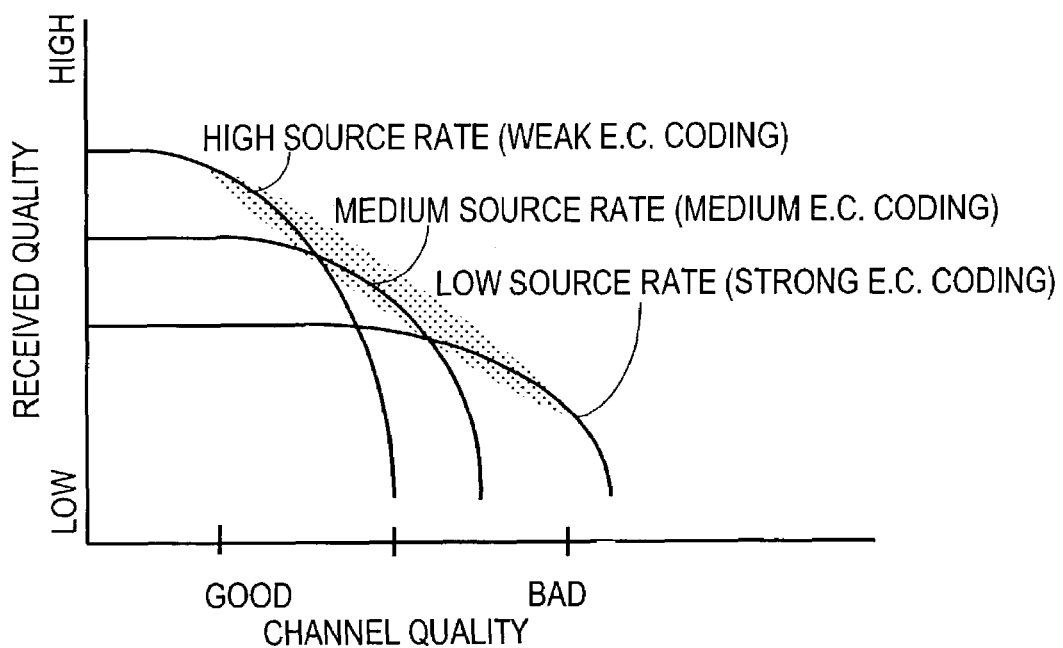
FIG. 2 shows a graph depicting relationships between different coding schemes, received quality of source information communicated through a channel, and channel quality, assuming other factors remain constant.

In the following discussion, the left-most one or two digits of reference numerals correspond to the number of a Figure where the referenced items can be found. For example, items referenced using reference numbers in the 400's may be found in FIG. 4, items referenced using reference numbers in the 500's may be found in FIG. 5, and so forth.

Figure 4:
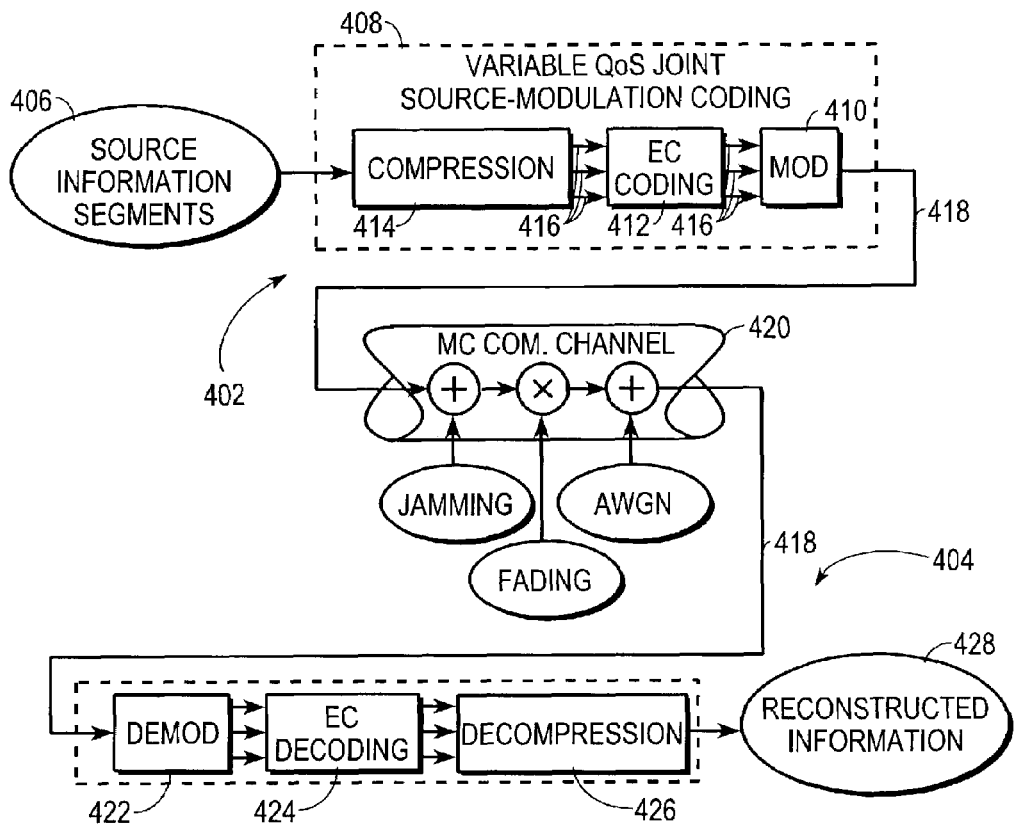
FIG. 4 shows a schematic diagram of a communication system employing compression, EC coding, and modulation and configured in accordance with the teaching of the present invention.

FIG. 4 shows a schematic diagram of a communication system 400 employing compression, EC coding, and modulation and configured in accordance with the teaching of the present invention. Communication system 400 includes a transmitter 402 and a receiver 404. Within transmitter 402, one or more segments of source information 406 are applied to a variable quality-of-signal (QoS) joint source-modulation coding block 408.

The type of information and the manner in which this information may be segmented are not critical features. In one embodiment, a variety of diverse information types (e.g., video, imagery, voice, data) may be jointly optimized and communicated through the present invention. But the present invention still provides benefits even when a single type of information is acted upon. For example, a single type of information that is an image may be segmented by considering the central portion of the image as one segment and outer portions as other segments. Alternatively, other processing (not shown) may be applied to delineate areas of particular interest in the image, such as faces, as one segment while delineating areas of lesser interest in the image, such as background, as another segment.

Within block 408, modulation (mod), EC coding, and compression blocks 410, 412, and 414, respectively, are jointly configured to concurrently operate at a plurality of QoS levels 416. While FIG. 4 depicts source information segments 406 as feeding compression block 414, then EC coding block 412, then modulation block 410 in a cascade manner, those skilled in the art will appreciate that this precise partitioning of functions is not a requirement. Compression may be omitted or integrated with coding. Likewise, compression may alternatively be applied outside of variable QoS joint source-modulation coding block 408 for some or all of information segments 406. Moreover, whether some of the allocation functions discussed herein are associated with modulation block 410 or coding block 412 is irrelevant.

A modulated communication signal 418 transmitted from transmitter 402 is applied to a physical communication channel 420. In the preferred embodiments, physical communication channel 420 is a time-varying, wideband, multicarrier (MC) communication (com) channel 420. While not a requirement of the present invention, physical communication channel 420 is a radio-frequency (RF) channel in one preferred embodiment. Particular advantages of the present invention may be achieved in a mobile RF communication environment where a wide range of channel characteristics may be expected. As depicted in FIG. 4, communication channel 420 may corrupt communication signal 418 through interference or jamming, frequency-selective fading, and/or additive white Gaussian noise (AWGN). Due to these factors, not only does physical channel 420 vary in time, but the character of channel 420 can see a wide range of variation throughout its bandwidth. When physical wideband communication channel 420 is viewed as encompassing a plurality of subchannels, some of the subchannels may have an excellent ability to convey data while others may have no more than a poor ability to convey data.

Receiver 404 monitors communication channel 420 for the now-corrupted communication signal 418. Receiver 404 performs functions that compliment those included in transmitter 402. Thus, FIG. 4 depicts communication signal 418 as being applied to a demodulator (demod) 422, an EC decoding block 424, and a decompression block 426. The precise partitioning of these complementary functions in receiver 404 need not be as precisely delineated as depicted in FIG. 4. After demodulation, decoding, and decompression, reconstructed information 428 is provided.

Figure 5:
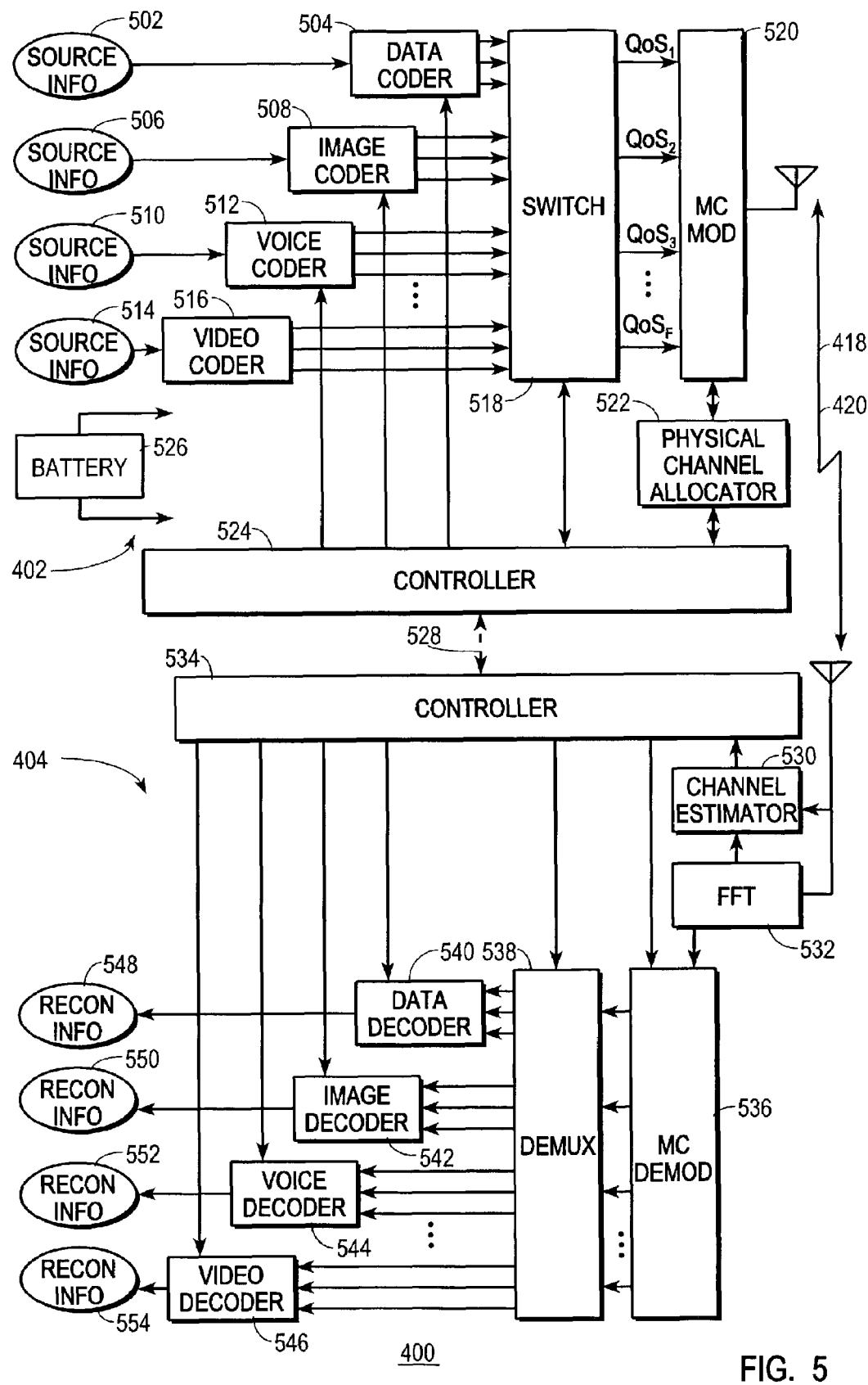
FIG. 5 shows a block diagram of a multi-carrier transmission system configured in accordance with one embodiment of the present invention.

FIG. 5 shows a block diagram of multi-carrier transmission system 400 configured in accordance with one embodiment of the present invention and presents this embodiment of system 400 in more detail than is shown in FIG. 4. Data source information 502, as distinguished from other possible types of source information, is provided to a data coder 504. Data in this context is variable-rate data. Variable-rate data differs from constant-rate data by requiring that a minimum quality level be maintained for communication. But the duration required to maintain that minimum quality can vary as needed to maintain the quality. Hence, the term variable rate refers to the variable duration that may be experienced in conveying a given block of data. Computer files are typical examples of variable rate data.

Data coder 504 may include the type of compression functions, such as zipping, that permit perfect reconstruction of the source information 502. Likewise, coder 504 may include block or other types of error-correction (EC) encoding as needed to achieve the desired minimum quality level. Data coder 504 may implement multiple encoding schemes, as represented by the multiple arrows issuing from data coder 504 in FIG. 5. Stronger encoding schemes may be applied to portions of source information 502 conveyed through regions of physical channel 420 that maintain a worse QoS (e.g., higher BER), and weaker encoding schemes may be applied to portions of source information 502 conveyed through regions of physical channel 420 that maintain a better QoS (e.g., lower BER).

Image source information 506 is provided to an image coder 508. Image source information 506 is usually considered to be variable rate data. But, images often do not need to maintain the strict, high quality of computer data. Thus, image coder 508 may include the type of compression that does not require precise reconstruction of the source but that allows tremendous amounts of compression. Moreover, compression may be combined with EC coding in a wavelet or subband-based coder, but this not a requirement. Image coder 508 may also implement different encoding schemes, with a stronger encoding scheme applied to portions of source information 506 conveyed through regions of physical channel 420 that maintain a worse QoS, and a weaker encoding scheme may applied to portions of source information 506 conveyed through regions of physical channel 420 that maintain a better QoS.

Voice source information 510 is provided to a voice coder 512, and video source information 514 is provided to a video coder 516. Voice source information 510 and video information 514 are constant rate data. Voice and video are humanly-perceived information where the change over time in the information is critical to its perception. Thus, received quality is typically permitted to degrade if necessary to achieve a constant duration of conveyance for a given frame of information, such as a speech over a set period of time or an image. Of course, voice information is not limited strictly to human voice but is well known to include a wide range of humanly perceivable audible information. Voice coder 512 may be implemented using a vocoder of the type commonly used in digital cellular telephony. But voice coder 512 may be adapted to provide multiple coded outputs corresponding to different QoS regions of physical channel 420. Likewise, video coder 516 may be implemented using a subband or wavelet-based coder adapted to provide multiple coded outputs corresponding to different QoS regions of physical channel 420.

The one or more outputs of data coder 504, image coder 508, voice coder 512, and video coder 516 couple to a switch 518. Switch 518 partitions the various coded segments of information from coders 504, 508, 512 and/or 516 into F of data streams, where F is an integer number representing the number of QoS regions specified at the moment for communication channel 420. The F data streams are applied to a multi-channel (MC) modulator (mod) 520, where they are modulated and broadcast into communication channel 420.

A physical channel allocator 522 couples to MC modulator 520 and to a controller 524. Controller 524 couples to switch 518 and to data coder 504, image coder 508, voice coder 512, and video coder 516. The distinction between physical channel allocator 522 and controller 524 is largely arbitrary. Physical channel allocator 522 provides a controlling function that determines how best to allocate power and data rates to the various subchannels of communication channel 420 to achieve the specified QoS regions to be maintained within communication channel 420. In addition, physical channel allocator 522 determines how many QoS regions to form in communication channel 420, what qualities such QoS regions will implement, and how many subchannels to allocate in each QoS region. Controller 524 coordinates the implementation of the different QoS regions between physical channel allocator 522 and data coder 504, image coder 508, voice coder 512, video coder 516, and switch 518. Physical channel allocator 522 is discussed in more detail below.

In one embodiment, a battery 526 energizes each of data coder 504, image coder 508, voice coder 512, video coder 516, switch 518, MC modulator 520, physical channel allocator 522, and controller 524. Thus, transmitter 402 may be used in mobile applications. However, the limited reserves of battery 526 makes the efficient operation of communication system 400 a desirable goal. Thus, the operating time of transmitter 402 is extended by transmitting as much source information as possible, or at as high a quality as possible, using as little power as possible. Physical channel allocator 522 is configured to achieve such efficiency.

FIG. 5 depicts a side-information link 528 as a two-way communication link extending between transmitter 402 and receiver 404. Side information link 528 does not experience coding through coders 504, 508, 512, or 516, but is desirably encoded through a predetermined, robust encoding scheme. FIG. 5 depicts side-information link 528 as being distinct from communication channel 420 because the control information that is communicated via side-information link 528 is treated differently from the source information. But side-information link may also be conveyed over communication channel 420.

In a preferred embodiment, transmitter 402 receives control information over side-information link 528 from receiver 404 that characterizes the current state of physical communication channel 420. That channel state information is used by physical channel allocator 522 in its allocation processes. In addition, transmitter 402 transmits control information over side-information link 528 to receiver 404 so that receiver 404 will know how to demodulate, decode, and parse the various information segments being transmitted. This control information represents a very small fraction of the total data transmitted from transmitter 402 to receiver 404, and vice-versa. It may be quantized and/or EC coded in any convenient and reasonably computationally efficient manner. Since it represents a small fraction of the total amount of data conveyed by communication system 400, the encoding efficiency of this control information is no more than a minor concern.

In receiver 404, communication signal 418 is monitored after corruption in physical communication channel 420. Although not explicitly shown, receiver synchronization is performed to an adequate level such that there are no cascading effects on the data demodulation. A channel estimator 530 and a fast Fourier transform (FFT) block 532 both monitor communication signal 418. Channel estimator 530 also receives an output from FFT block 532. An output from channel estimator 530 is provided to a controller 534.

FFT 532 separates communication channel 420 into its constituent subchannels. Using the pre- and post-FFT versions of communication channel 420, channel estimator 530 determines the channel-gain-to-noise ratio (CGNR) present at the various subchannels.

Those skilled in the art will appreciate that a useful definition for the signal-to-noise ratio ($SNR_i^q$) for the $i^{th}$ subchannel in the $q^{th}$ QoS region is the power transmitted (for the $i^{th}$ sub-channel in the $q^{th}$ QoS region), $P_i^q$ multiplied by the product of the symbol period, T, and the subchannel gain, $|H_i^q|^2$, divided by two times the subchannel noise power, $2\sigma_i^2$. Based on this definition, the channel-gain-to-noise ratio (CGNR) for the $i^{th}$ sub-channel in the $q^{th}$ QoS region may be found by dividing $SNR_i^q$ by $P_i^q$ or $CGNR_i^q = SNR_i^q/P_i^q$ or equivalently $CGNR_i^q = T|H_i^q|^2/2\sigma_i^2$.

But other similar definitions for channel-gain-to-noise ratio (CGNR) known to those skilled in the art may be useful as well. Channel estimator 530 may use any estimation method pertinent to wide-band, time-varying transmission. This channel state information is provided to controller 534 and passed back to transmitter 402 via side-information link 528.

FFT 532 and controller 534 couple to a MC demodulator (demod) 536, which demodulates the various subchannels of communication channel 420. Outputs from demodulator 536 are passed to a demultiplexer (demux) 538, where they are parsed and then passed to appropriate decoders, such as a data decoder 540, an image decoder 542, a voice decoder 544, and/or a video decoder 546.

Each of decoders 540, 542, 544, and 546 may receive control information from controller 534, and decoders 540, 542, 544, and 546 respectively provide reconstructed (recon) data information (info) 548, reconstructed image information 550, reconstructed voice information 552, and reconstructed video information 554. Data decoder 540 performs a complementary process to the coding process performed by data coder 504; image decoder 542 performs a complementary process to the coding process performed by image coder 508; voice decoder 544 performs a complementary process to the coding process performed by voice coder 512; and, video decoder 546 performs a complementary process to the coding process performed by video coder 516.

Those skilled in the art will appreciate that one or more of the various components depicted as separate items in either transmitter 402 or receiver 404 in FIG. 5 may be implemented collectively within a digital signal processor. Moreover, nothing requires any one of coders 504, 508, 512, and 516 to provide multiple outputs for source information coded using multiple coding schemes that accommodate multiple conveyance qualities. Rather, in one embodiment, each of one or more of coders 504, 508, 512, and 516 provide single outputs for source information coded using a single conveyance quality. But in this embodiment, different segments of the collective pool of source information are nevertheless encoded using different encoding schemes configured for different conveyance qualities.

Figure 6:
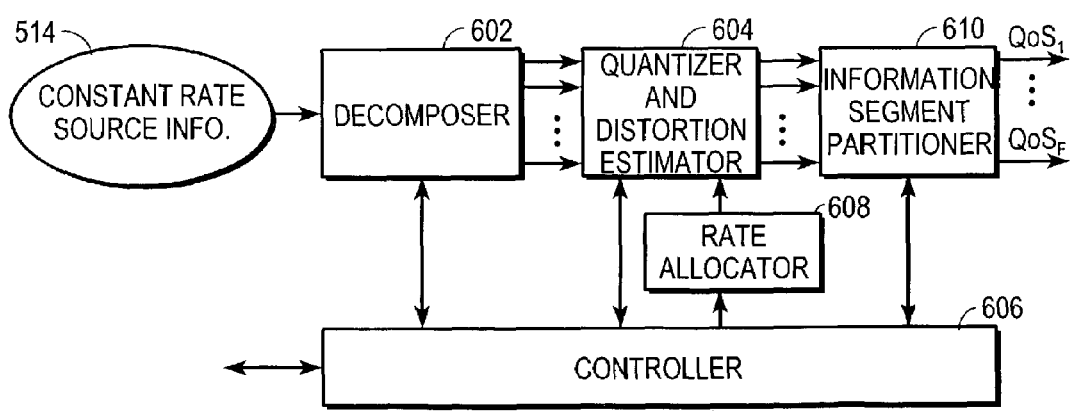
FIG. 6 shows a block diagram of a first image/video coder usable in a transmitter portion of one embodiment of the present invention.

FIG. 6 shows a first block diagram of a video coder 516 usable in transmitter 402 of one embodiment of communication system 400. In this embodiment, data coder 504, image coder 508, and voice coder 512, and switch 518 from FIG. 5 may be omitted, so that a single source of information, in this example video source information 514, is coded and partitioned using different coding schemes configured for different conveyance qualities.

Referring to FIG. 6, the constant rate source information 514 supplies a single image of the video at a time to a decomposer 602, which decomposes each image into a number of subbands. A typical decomposer might decompose each image into 22 subbands using a Mallat tree decomposition, but this not a requirement. The decomposer would then compute statistics of the subbands and normalize the subbands to zero-mean and unit variance. The normalized subbands may then be all-pass filtered by a phase-scrambling stage (not shown) and output from decomposer 602.

The processed subbands from decomposer 602 are provided to a quantizer and distortion estimator 604. Quantizer 604 desirably implements a trellis coded quantizer using codebooks computed off-line for various encoding bit rates and probabilities of error in a manner well-known to those skilled in the art. Encoding bit rate refers to the number of compressed encoded bits generated per input sample by quantizer 604. A trellis coded quantizer performs both compression and EC coding functions. The compression is the type that does not necessarily allow for perfect reconstruction of the source information, but which can achieve very large amounts of data reduction. A by-product of trellis coded quantizers is the calculation of distortion estimates for the specified probability of error. A distortion estimate indicates the actual distortion that should be present in a reconstructed image for a given coding scheme, or set of coding schemes, provided that the coded data are actually conveyed at the specified probabilities of error.

A controller 606, which may be viewed as a part of controller 524, couples to decomposer 602, quantizer and distortion estimator 604, a rate allocator 608, and an information segment partitioner 610. Encoded outputs from quantizer 604 associated with sample sets formed from the subbands are also input to information segment partitioner 610. An output of rate allocator 608 couples to quantizer 604.

The various subbands from decomposer 602 are associated with various encoding bit rates in rate allocator 608. Generally, higher energy sub-bands are associated with higher encoding bit rates while lower energy sub-bands are associated with lower encoding bit rates. Each of the subbands generated by decomposer 602 are allocated to a number, typically greater than two and less than twelve, of fixed encoding bit rates through the operation of rate allocator 608. The precise number of fixed encoding bit rates to be associated with each subband is not an important factor. The rate-allocation process of rate allocator 608 causes the formation of sample sets, wherein each sample set includes sample blocks from one or more of the subbands generated by decomposer 602. All samples in each sample set for each fixed encoding bit rate are encoded together within quantizer 604.

Information segment partitioner 610 maps the encoded subband sets generated by quantizer 604 into F QoS regions. Desirably, higher energy subbands are mapped into higher quality QoS regions. For each image, controller 606 desirably controls quantizer 604 and information segment partitioner 610 to repetitively quantize the subbands using the different bit-error probabilities that correspond to the different QoS regions. The result is that different iterations of quantization by quantizer 604 implement different encoding schemes upon the source information, and different portions of the total collection of subbands from different iterations are mapped to different QoS regions in information segment partitioner 610. Controller 606 also causes the transmission of the mean of the lowest frequency subband and the standard deviations of the other subbands over side-information link 528. In addition, an initial trellis state for each sub-band, a target compression ratio, and an indication of the subband set to QoS region mapping performed by information segment partitioner 610 may be transmitted over side information link 528.

The operation of video coder 516 is repeated for subsequent images at a substantially constant rate so that a stream of encoded video is provided at the output of video coder 516. In one embodiment discussed in more detail below, the quantization and mapping operations are performed a plurality of times on each image to determine the image's distortion estimates. Each time, the quantization and mapping operations are performed for a different mix of QoS regions and rates that might be accommodated by the QoS regions. After distortion estimates are obtained for a variety of QoS region and rate mixes, then the quantization and partitioning from only a selected one of the QoS region and rate mixes is used in transmitting communication signal 418 from transmitter 402.

Those skilled in the art will appreciate that these and similar techniques may be applied to other types coders, whether for constant rate data or variable rate data. Another coder which is suitable for highly compressible data, whether imagery, video, or voice, is discussed below in more detail in connection with FIGS. 17-19.

Figure 7:
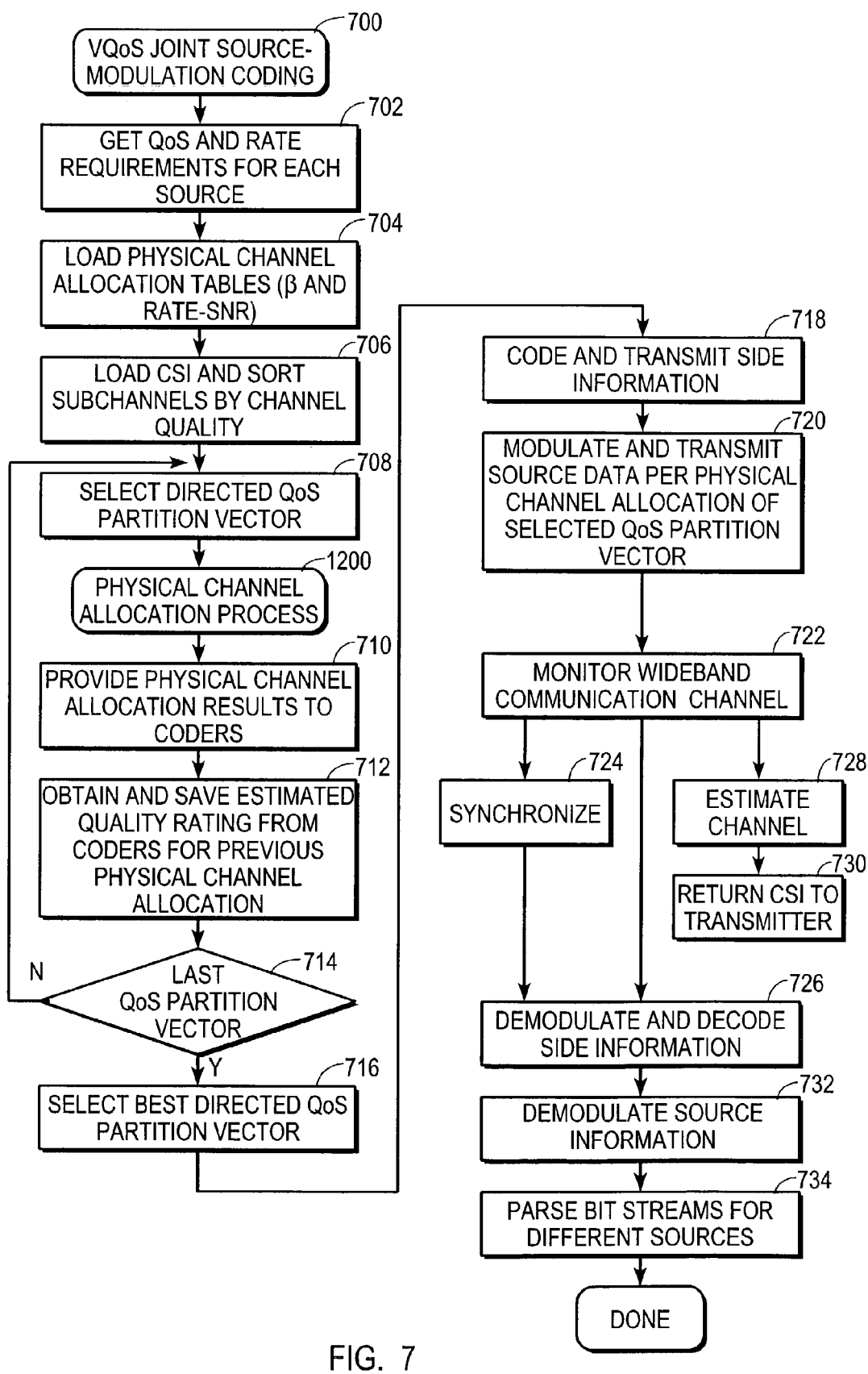
FIG. 7 shows a flow chart of a variable quality-of-signal (VQoS) joint source-modulation coding process carried out for a transmitter portion of one embodiment of the present invention.
Figure 8:
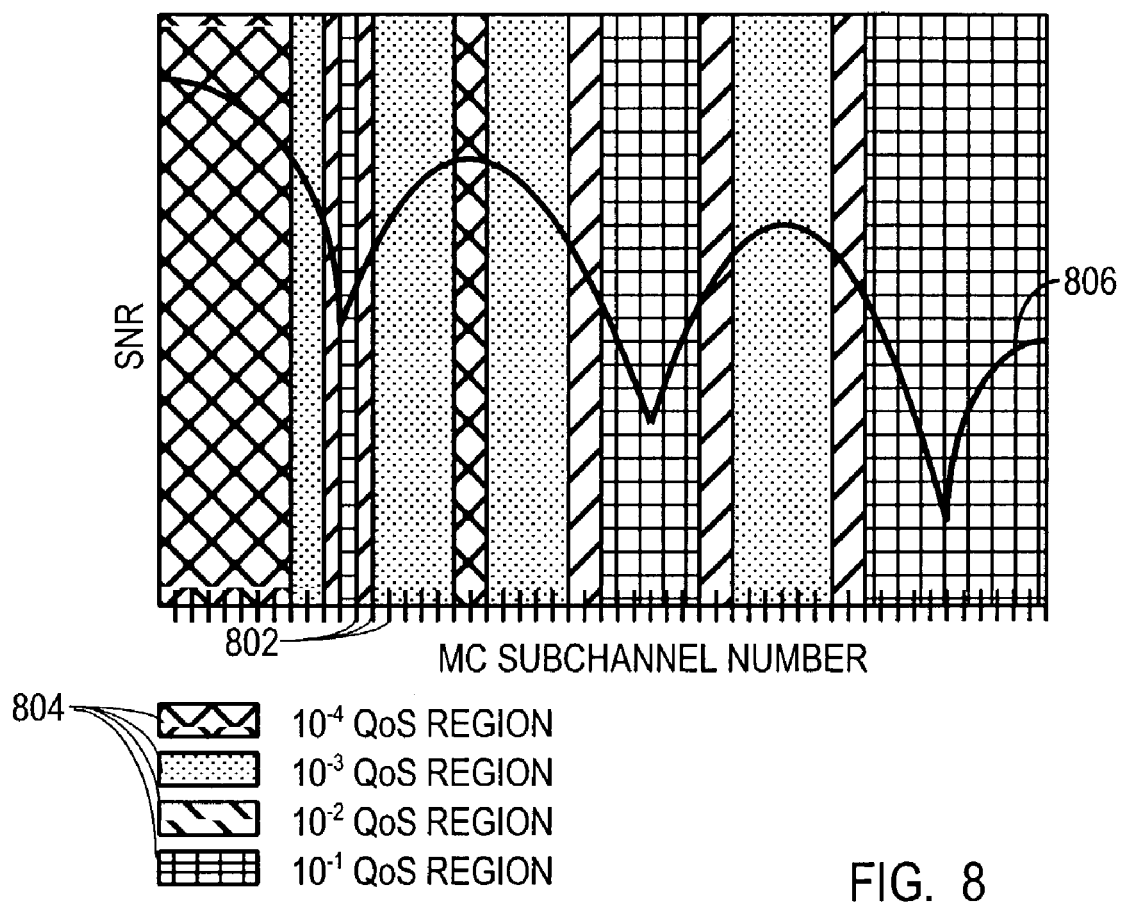
FIG. 8 shows an exemplary graph depicting the grouping of subchannels into QoS regions and further depicting a signal-to-noise ratio (SNR) produced by a transmitter portion of one embodiment of the present invention in response to an exemplary communication channel that demonstrates frequency-selective fading.

FIG. 7 shows a flow chart of a variable quality-of-signal (VQoS) joint source-modulation coding process 700 carried out for transmitter 402 in one embodiment of the present invention. FIG. 8 shows an exemplary graph depicting the grouping of subchannels 802 into QoS regions 804 and further depicting a signal-to-noise ratio (SNR) applied by MC modulator 520 in subchannels 802 in response to an exemplary communication channel that demonstrates frequency-selective fading.

The problem addressed by process 700 is the allocation of transmission rates, in bits per symbol per subchannel 802, the allocation of power to subchannels 802, the grouping of subchannels 802 into QoS regions 804, and the sizes of QoS regions 804 in number of subchannels 802 per QoS region 804. A complex optimization problem is presented due to the number of variables involved and the number of different states that each variable may take.

If a constrained optimization process were applied, where all combinations of rate, power, and QoS-region groupings were evaluated and a best combination selected, then an intractable problem would be presented. Without considering QoS region 804 grouping possibilities in a search space, $(R+1)^N$ different outcomes are available, where up to R bits per symbol may be allocated per subchannel 802 and power may be allocated in N subchannels 802, with R and N being integer numbers. With an arbitrary example of 256 subchannels and a maximum rate of 5 bits per symbol to be allocated in each of the 256 subchannels, approximately $10^{199}$ different outcomes would be possible, without even considering the grouping of subchannels 802 into QoS regions 804. But MC communication system 400 is not limited to a mere 256 subchannels and may divide communication channel 420 into several thousand subchannels 802. MC communication system 400 is not limited to a maximum rate of only 5 bits per symbol but may operate at a maximum rate of significantly more than 5 bits per symbol. And, MC communication system 400 may group subchannels 802 together in a variety of ways to achieve the number F of QoS regions 804.

In order to achieve a tractable solution, process 700 implements an unconstrained optimization algorithm to generate the type of results that are indicated in FIG. 8 for an exemplary scenario. These results indicate that different subchannels 802 from communication channel 420 have been grouped together into different QoS regions 804. FIG. 8 depicts four QoS regions 804 having probabilities of error of $10^{-1}$–$10^{-4}$ errors per symbol associated therewith. QoS regions 804 need not be contiguous within communication channel 420. Nothing requires the present invention to implement any set number of QoS regions 804 or to associate any QoS region 804 with a set specific probability of error. FIG. 8 also includes a trace 806 that indicates the allocation of power to subchannels 802. Trace 806 specifies a signal-to-noise (SNR) ratio to achieve in each subchannel 802. SNR is related to power when channel state information is accounted for. Although not specifically indicated in FIG. 8, rate is also specified for each subchannel 802.

Process 700 is implemented in physical channel allocator 522. Process 700 implements various tasks under the control of a software program in a manner well known to those skilled in the art. This software program, as well as the tables, variables, and other data structures used by the program, may be stored in a memory (not shown). Physical channel allocator 522 may be implemented using a digital signal processor or other processor- or microprocessor-based circuit structures, and may share the circuit structure with other components of transmitter 402.

Process 700 includes a task 702 which gets minimum QoS region number and rate requirements for each source information segment to be encoded, modulated, and transmitted in transmitter 402 within a foreseeable limited period of time in the near future. These minimums may be predetermined numbers that reflect the design constraints of coders 504, 508, 512, or 516. But nothing requires any of coders 504, 508, 512 or 516 to have a set minimum rate requirement or a minimum QoS region number.

Next, a task 704 loads physical channel allocation tables. FIGS. 9 and 10 respectively show examples of beta (β) and rate-SNR physical channel allocation tables 900 and 1000 to be used in connection with the process 700. The data included in physical channel allocation tables 900 and 1000 are channel independent. In other words, the data are computed off-line with respect to theoretical limits and without consideration of any actual channel conditions, then loaded and used in table lookup operations in a manner discussed below to quickly resolve optimization solutions. When specific channel conditions are known, physical channel allocation tables 900 and 1000 are used to arrive at an optimization solution tailored for the specific channel conditions. Tables 900 and 1000 may also include built-in, real-world performance degradations that can be expected in various systems.

β physical channel allocation table 900 includes different data structures 902 for the different QoS regions 804 that coders 504, 508, 512, and/or 516 and MC modulator 520 may form in communication channel 420. But nothing in process 700 requires all the QoS regions 804 for which data structures 902 are provided to be formed in communication channel 420, and process 700 may subsequently conclude that desirable results are achieved using fewer QoS regions 804. FIG. 9 depicts data structures 902 labeled $QoS_1$-$QoS_5$ corresponding to five different QoS regions 804. This number of regions is not a requirement. Likewise, β physical channel allocation table 900 includes entries in each of its constituent data structures 902 for each rate that MC modulator 520 may implement in any single subchannel 802. FIG. 9 depicts rates of up to 10 bits per symbol, but this is not a requirement. The β values included in table 900 relate theoretical rate to power for the specified quality-of-signal and for the modulation format implemented by MC modulator 520. But power is represented in terms of the channel-to-noise ratio observed in a receiver.

Rate-SNR physical channel allocation table 1000 includes entries in a one-to-one correspondence with the entries of β physical channel allocation table 900. Thus, Rate-SNR physical channel allocation table 1000 includes data structures 1002 for the different QoS regions that transmitter 402 may implement in communication channel 420, and Rate-SNR physical channel allocation table 1000 includes entries in each of the constituent data structures 1002 for each rate that MC modulator 520 may implement in any single subchannel 802. The values included in Rate-SNR table 1000 are SNR values that modulator 520 may be asked to achieve by the application of power in the subchannels 802. They represent the theoretical SNR needed to achieve a specified rate at a specified QoS for the modulation format implemented by MC modulator 520.

After task 704, a task 706 loads channel state information (CSI) and sorts subchannels 802 by the channel quality indicated in the CSI. The CSI may indicate conditions similar to those depicted in FIG. 3, or other conditions. The CSI may be obtained from receiver 404 over side-information link 528. The CSI loaded at task 706 may simply reflect the channel-gain-to-noise ratios (CGNRs) available in all subchannels 802, as determined at a recent measurement and estimation thereof in channel estimator 530. However, nothing prevents the application of further processing to data provided by channel estimator 530 to improve the estimation for the period of time in which data will be transmitted. The sorting operation of task 706 is desirable because it accommodates the association of QoS regions 804 for which better signal quality will be provided, relative to the other QoS regions 804 to be supported, with the better subchannels 802. The CSI will indicate that the better subchannels 802 have higher CGNRs relative to the other subchannels 802.

Figure 11:
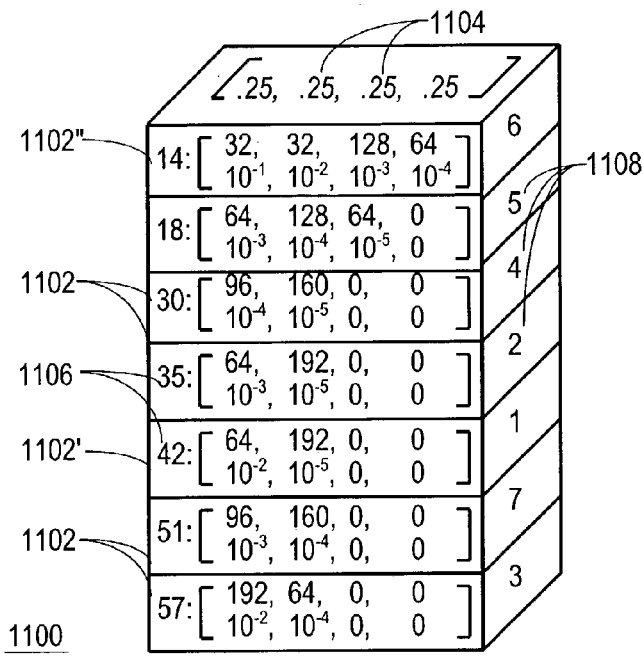
FIG. 11 shows a block diagram of an exemplary set of directed QoS partition vectors used with the process of FIG. 7.

Following task 706, a task 708 selects a single directed QoS partition vector to process. FIG. 11 shows a block diagram of an exemplary set 1100 of directed QoS partition vectors 1102 used with process 700. Task 708 selects a single one of directed QoS partition vectors 1102 for processing.

Each directed QoS partition vector 1102 represents a data structure in which certain control data items are associated together. Each directed QoS partition vector 1102 associates QoS regions 804 with numbers of subchannels 802 to be included in each QoS region 804. An example directed QoS partition vector 1102' depicted in FIG. 11 defines two QoS regions 804, with the two QoS regions 804 having bit error rates of $10^{-2}$ and $10^{-5}$. A total of 256 subchannels 802 are allocated in example 1102', with 64 of the 256 subchannels allocated to the $10^{-2}$ QoS region 804 and 192 to the $10^{-5}$ QoS region 804. A different example directed QoS partition vector 1102" depicted in FIG. 11 defines four QoS regions 804, with the four QoS regions 804 having bit error rates of $10^{-1}$, $10^{-2}$, $10^{-3}$, and $10^{-4}$. The 256 subchannels 802 are allocated in example 1102", with 32 subchannels 802 allocated to the $10^{-1}$ QoS region 804, another 32 subchannels 802 allocated to the $10^{-2}$ QoS region 804, 128 subchannels 802 allocated to the $10^{-3}$ QoS region 804, and 64 subchannels 802 to the $10^{-4}$ QoS region 804. In addition, each directed QoS partition vector 1102 may include data 1104 that indicates the fraction of total power to budget for application in each QoS region 804. The exemplary allocation depicted in FIG. 11 indicates equal power for all QoS regions 804, but this is not a requirement. And, each directed QoS partition vector 1102 may include an index 1106 for identification purposes and a ranking number 1108 that indicates overall estimated performance when applied to a variety of test scenarios.

Desirably, the number F of QoS regions 804 defined in any given directed QoS partition vector 802 is greater than or equal to two so that performance improvements will be realized over fixed QoS modulation and coding. In addition, the number F is desirably less than or equal to ten so that the optimization problem remains tractable. Moreover, desirably a variety of values F are represented in set 1100 of directed QoS partition vectors 1102 so that a diverse assortment of control configurations will be available for matching current actual channel conditions with source information to be communicated. No limit is placed on the number of directed QoS partition vectors 1102 that may be included in set 1100, except that the fewer 1102 directed QoS partition vectors 1102 included in set 1100, the more quickly all QoS partition vectors may be processed in an embodiment of the present invention that processes them all. Set 100 clearly includes fewer directed QoS partition vectors 1102 than result from all possible combinations of subchannel-to-QoS region associations.

The formation of set 100 is discussed below in connection with FIGS. 14-16, which present a process for identifying directed QoS partition vectors 1102 from a larger population of QoS partition vectors. Any one of the directed QoS partition vectors 1102 within set 1100 is expected to achieve acceptable results. Consequently, the specific single directed QoS partition vector 1102 selected for processing in task 708 is not a critical feature of the present invention. In fact, in one embodiment all directed QoS partition vectors 1102 included in set 1100 will eventually be processed, so task 708 may make a selection based on index number 1106 in a way that prevents subsequent iterations of task 708 from reselecting a directed QoS partition vector 1102. In an embodiment that does not process all directed QoS partition vectors 1102 included in set 1100, task 708 may select the highest ranking directed QoS partition vector 1102 or analyze the CSI information loaded above in task 706 and predict which directed QoS partition vector 1102 will provide the best results for the current CSI information.

After task 708, a physical channel allocation process 1200 is performed. Physical channel allocation process 1200 generally groups subchannels 802 together in QoS regions 804 as defined by the directed QoS partition vector 1102 selected in task 708 and allocates a total power budget for communication channel 420 among the subchannels 802 so that an efficient allocation of power results. In addition to power allocation, a rate is specified for each subchannel 802 in bits per symbol so that the specified signal quality for the respective QoS regions 804 defined by the directed QoS partition vector 1102 will be achieved. Details of process 1200 are discussed below in connection with FIG. 12.

When physical channel allocation process 1200 finishes its allocation of power and rates to subchannels 802 for the selected directed QoS partition vector 1102, three optional tasks 710, 712, and 714 may be performed. Optional tasks 710, 712, and 714 are beneficial when highly compressible data, such as imagery or constant-rate source information, e.g., video or voice, is being coded and modulated. Coders 508, 512, and/or 516 for such source information may jointly combine compression and coding functions, as indicated for a subband video coder 516 in FIG. 6. In such situations, coding efficiency will be dependent upon channel conditions and the source information to be communicated. Thus, power and rate allocations resulting from a directed QoS partition vector 1102 that yields excellent results over a variety of different scenarios may nevertheless yield disappointing results when applied to a specific set of source information; and, power and rate allocations resulting from a directed QoS partition vector 1102 that appears to yield only moderate results over a variety of different scenarios may nevertheless yield excellent results when applied to a specific set of source information. Tasks 710, 712, and 714 allow the source information to influence the selection of a directed QoS partition vector 1102 to use in modulating and transmitting source information over communication channel 420.

Task 710 provides the physical channel allocation results from the current iteration of physical channel allocation process 1200 to subband coders, e.g., coders 508, 512, and/or 516, for processing along with the respective source information. The allocation results include at least an identification of the QoS regions 804 for which allocations were made and cumulative bit rates conveyable through the specified QoS regions 804.

After task 710, task 712 obtains and saves estimated quality ratings from subband coders in connection with processing the source information with allocation results from a previous iteration of physical channel allocation process 1200. Following task 712, query task 714 determines whether the last directed QoS partition vector 1102 from set 1100 has been processed by physical channel allocation process 1200. So long as additional directed QoS partition vectors 1102 remain in set 1100 to be processed, program control loops back to task 708 to select and process another directed QoS partition vector 1102.

During tasks 710 and 712, the source information being processed in the subband coders need not be modulated and transmitted. While operating in the programming loop consisting of task 708, process 1200, and tasks 710, 712 and 714, a previous image or other block of source information that has been buffered may be modulated and transmitted. The source information processed by the subband coders while operating in this programming loop is being partitioned into QoS regions and quantized to estimate the distortion or quality of the expected reconstructed source information using the coding schemes the subband coders will apply to the source information with specified physical channel allocation results. Thus, when subband coders partition and quantize the source information for a first physical channel allocation resulting from a first directed QoS partition vector 1102, process 1200 is concurrently resolving a physical channel allocation resulting from a second directed QoS partition vector 1102. Due to the concurrent processing, little additional time is required for coders to estimate quality above the time required to determine physical channel allocations for an entire set 1100 of directed QoS partition vectors 1102.

When task 714 eventually encounters the last directed QoS partition vector 1102, a task 716 selects the best directed QoS partition vector to use in modulating and transmitting the source information over communication channel 420. Task 716 may wait to make its selection until the final physical channel allocation has been processed for estimated quality by the subband coders. Task 716 may evaluate peak-signal-to-noise-ratios (PSNRs), mean-square error (MSE), or other quality or distortion metrics associated with the source information when coded for the various physical channel allocations that resulted from the different directed QoS partition vectors 1102 included in set 1100. The directed QoS partition vector 1102 that resulted in a physical channel allocation which, when processed in subband coders, produced the best quality or least distortion may be selected in task 716.

After task 716, a task 718 codes and transmits the side information over side-information link 528. The side information represents control information that informs the receiver how to demodulate and decode the soon-to-be-transmitted source information.

Next, a task 720 causes the coded source information to be modulated and transmitted over communication channel 420. Desirably, the subband coders have already coded and saved the source information for the various different physical channel allocations in different buffers, and the selection of task 716 identifies the buffer from which to read coded source information. Modulation is performed in MC modulator 520 so that source information coded for conveyance through a specified QoS region 804 is transmitted on the subchannels 802 assigned to that QoS region 804 by the selected directed QoS partition vector 1102 and at the bit rates and power levels allocated for the selected directed QoS partition vector 1102.

A task 722 is concerned with the operation of receiver 404. Although the flow chart of FIG. 7 indicates that task 722 occurs after task 720, those skilled in the art will appreciate that task 722 may take place over an extended duration, even when other tasks of process 700 are underway. During task 722 receiver 404 monitors wideband communication channel 420. Task 722 may also monitor other channels if such other channels are used for side-information link 528. A task 724, which results from task 722, causes receiver 404 to synchronize to signals broadcast in the monitored channels, and a task 726 demodulates and decodes the side information transmitted above during task 718. In addition, a task 728, which also results from task 722, causes channel estimator 530 to formulate an estimate of communication channel 420. Following task 728, a task 730 causes the channel state information which results from the channel estimation of task 728 to be returned to transmitter 402 for use in subsequent iterations of process 700 and of the physical channel allocations that result.

After task 726 demodulates and decodes the side information, the side information is further processed as may be necessary then programmed into demodulator 536 and decoders 540, 542, 544, and/or 546 for use in demodulating and decoding the soon-to-be-transmitted source information. Then, in a task 732 demodulator 536 demodulates the source information, and demultiplexer 538 parses the bit stream into separate streams in a task 734. The separate parsed bit streams correspond to the specified QoS regions 804 and are passed to the appropriate decoders for the specified QoS regions 804.

After task 734 process 700 is done for a single image or other block or frame of source information. But process 700 may be immediately repeated for subsequent images, or other blocks or frames.

Figure 12:
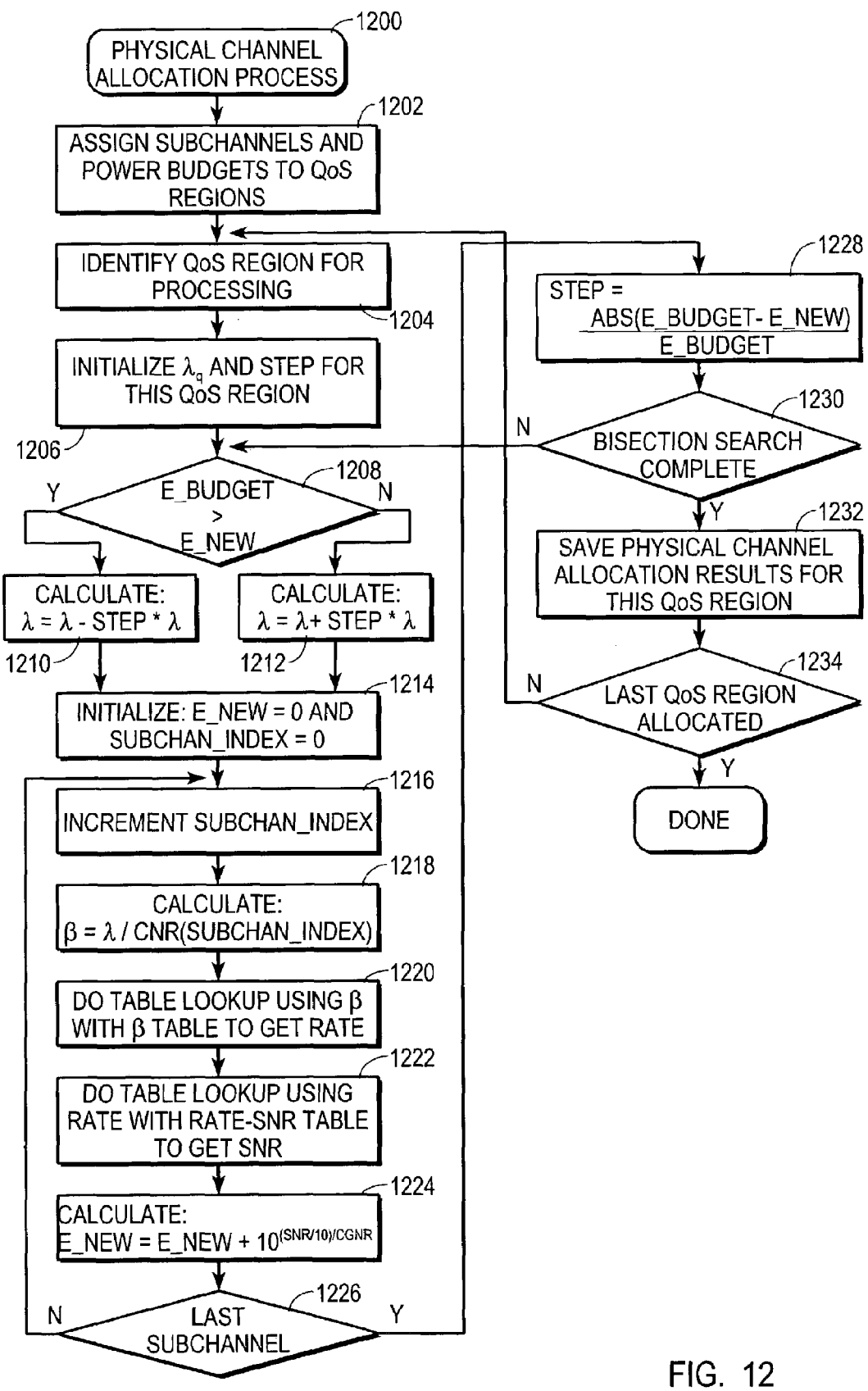
FIG. 12 shows a flow chart of a physical channel allocation process used by the process of FIG. 7.

FIG. 12 shows a flow chart of an exemplary physical channel allocation process 1200 around which VQoS joint source-modulation coding process 700 may be built. As discussed above in general terms, process 1200 groups subchannels 802 together in QoS regions 804 as defined by a directed QoS partition vector 1102 and allocates a total power budget for communication channel 420 among the subchannels 802 so that an efficient allocation of power results. Process 1200 also specifies a rate for each subchannel 802 so that the specified signal quality for the respective QoS regions 804 defined by the directed QoS partition vector 1102 will be achieved.

Figure 13:
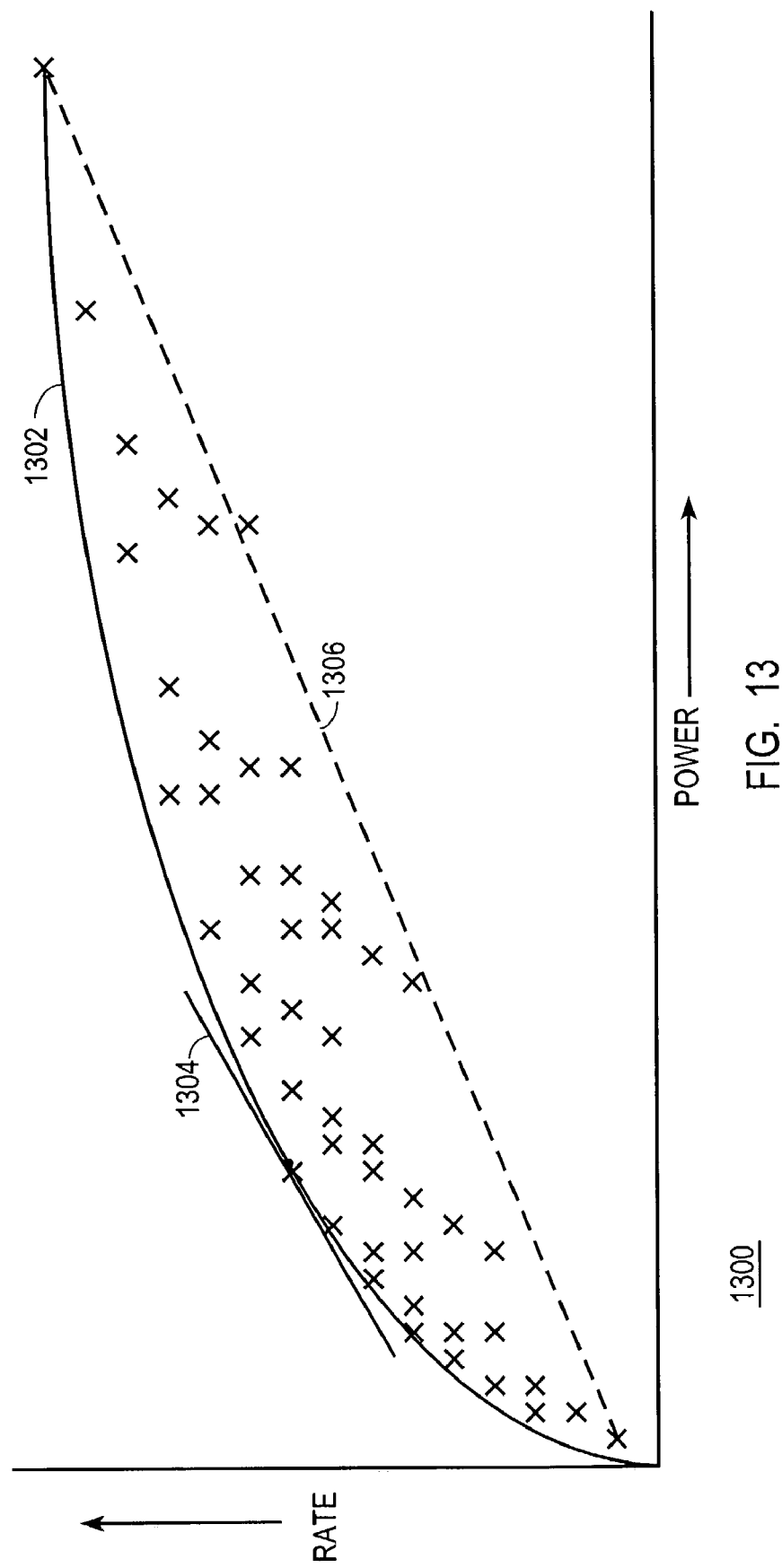
FIG. 13 shows a convex rate-power curve for an multicarrier (MC) modulation example in which different combinations of rate and power are possible in modulating up to five bits/symbol in up to three different subchannels.

FIG. 13 shows a rate-power relationship 1300 for a trivial multi-carrier (MC) modulation example in which different combinations of rate and power are possible in modulating up to five bits/symbol in up to three different subchannels. Of course, realistic MC modulation examples will support many more subchannels and more rates. But rate-power relationship 1300 presents a characteristic example. All combinations of rate and power achievable in relationship 1300 reside on a convex hull 1302 or on the side of convex hull 1302 representing more power and a lower rate. In the preferred embodiments of the present invention, MC modulator 520 desirably implements a modulation format where rate is a convex function of power, similar to that depicted in FIG. 13. M-QAM modulation formats are examples where rate is a convex function of power, and are suitable for use by MC modulator 520.

Convex hull 1302 represents the theoretical continuous curve that defines the Shannon limit. Any operating point closer to convex hull 1302 than another operating point is considered to be a more efficient operating point. Other operating points are less efficient compared to these near-hull points because for these other points the same power achieves lower rates or the same rate may be achieved only with the expenditure of more power. But the discrete combinations of bit rates and power allocations that can be applied prevent most combinations from residing on or near convex hull 1302. Accordingly, only those few points residing near convex hull 1302 need be examined in optimizing a physical channel allocation. The use of a modulation format where rate is a convex function of power allows rate to be defined as a function of power and a partial derivative to be taken and equated to zero to identify a minimum.

In order to perform an unconstrained optimization so that the physical channel allocation problem is tractable, a cost relationship through which rate may be identified as a function of power is defined. Thus, for each QoS region 804:

$$\min J^q(\lambda) \cong -\sum_{i=1}^{N_q} R_i^q + \lambda_q \sum_{i=1}^{N_q} P_i^q \qquad \text{EQ 1}$$

where,
$J^q(\lambda)$ is the Lagrange cost for the $q^{th}$ QoS region, ($\lambda \geq 0$),
i is a subchannel index,
q is a QoS region index,
$N_q$ is the number of subchannels in QoS region q,
$\lambda_q$ is said Lagrange multiplier for QoS region q,
$R_i^q$ is a rate in bits per symbol to be applied in the $i^{th}$ subchannel of the $q^{th}$ QoS region, and
$P_i^q$ is the Power required in the $i^{th}$ subchannel of the $q^{th}$ QoS region to achieve $R_i^q$ at the indicated QoS.

The Lagrange cost is minimized when, for a fixed $\lambda$:

$$\partial J^q(\lambda)/\partial P_i^q = 0 \qquad \text{EQ 2}$$

Or when:

$$\partial R^q(\lambda)/\partial P_i^q = \lambda_q, \text{ for } i=1, 2, \ldots, N_q \qquad \text{EQ 3}$$

Signal-to-noise ratio (SNR) for an $i^{th}$ subchannel 802 in a $q^{th}$ QoS region 804 is:

$$SNR_i^q = (P_i^q T |H_i^q|^2 / 2\sigma_i^2), \qquad \text{EQ 4}$$

and channel-gain-to-noise ratio (CGNR) for an $i^{th}$ subchannel 802 in a $q^{th}$ QoS region 804 is:

$$CGNR_i^q = (T|H_i^q|^2 / 2\sigma_i^2) \qquad \text{EQ 5}$$

where,
$H_i^q$ = subchannel gain,
$\sigma_i^2$ = subchannel noise power, and
T = symbol period.

Thus, the cost relationship defined by the Lagrange multiplier for the $q^{th}$ QoS region 804 will be:

$$\frac{\partial R_i^q(SNR_i^q)}{\partial (SNR_i^q)} CGNR_i^q = \lambda_q \qquad \text{EQ 6}$$

In other words, the slope 1304 of convex hull 1302 closely approximates the Lagrange multiplier $\lambda_q$ that defines the cost relationship.

Process 1200 seeks to identify, for each QoS region 804, the cost relationship $\lambda_q$ where the value to communication system 400 of a marginal increase in rate roughly equals, in "value" to communication system 400, the marginal increase in power required to achieve the rate increase. That cost relationship is imposed on all subchannels 802 in the QoS region 804 such that substantially the entire power budget for the QoS region 804 is allocated to the subchannels 802 of the QoS region 804. The process then repeats for other QoS regions 804.

Process 1200 includes a task 1202 which assigns subchannels 802 and power budgets to QoS regions 804 as specified in the directed QoS partition vector 1102 being operated upon in this iteration of process 1200. Subchannels 802 were sorted by channel quality above in task 706. In the sorted order, subchannels 802 are assigned to QoS regions 804 so that better subchannels 802 are assigned to better QoS regions 804. Better subchannels 802 are characterized by higher CGNRs, and better QoS regions are characterized by lower bit error rates. For directed QoS partition vector 1102', the best 192 subchannels 802 are assigned to the QoS region 804 having a bit error rate of $10^{-5}$, and the worst 64 subchannels 802 are assigned to the QoS region 804 having a bit error rate of $10^{-2}$. In addition task 1202 assigns power budgets to each of the QoS regions 804 specified in the directed QoS partition vector 1102 by applying the indicated fractions from data 1104 in directed QoS partition vector 1102 to a total power budget.

Following task 1202, a task 1204 identifies a QoS region 804 to process. A programming loop will be performed where the same tasks are repeated for each of the specified QoS regions 804 in the subject directed QoS partition vector 1102. Task 1204 identifies the single QoS region 804 for which subsequent tasks will be performed. Next, a task 1206 initializes the Lagrange multiplier $\lambda_q$ for this QoS region 804. The initial value selected for Lagrange multiplier $\lambda_q$ is not a critical parameter, but should be some slope 1304 which appears at some point along convex hull 1302. One initial value that may be used is graphically indicated in FIG. 13 as slope 1306, but this is not a requirement. Task 1206 initializes a step value, that will be discussed below, to zero.

Following task 1206, process 1200 performs a bisection search to resolve that value of $\lambda_q$ which, when applied over all subchannels 802 in the QoS region 804 substantially allocates all power budgeted for the QoS region 804 at the indicated signal quality. A query task 1208 is used to control whether a subsequent value of $\lambda_q$ in the bisection search will be greater or less than a previous value. A variable labeled "E_NEW" in FIG. 12 corresponds to the accumulated power allocated to the $N_q$ subchannels 802 assigned to the subject QoS region 804 in a previous iteration of the bisection search. If the power budgeted to this QoS region 804 exceeds the accumulated power previously allocated, then the power budget has not been fully allocated, and a task 1210 reduces $\lambda q$ by the fraction of $\lambda_q$ obtained from multiplying the step value by $\lambda_q$. If the power budgeted to this QoS region 804 is less than the accumulated power previously allocated, then too much power has been allocated, and a task 1212 increases $\lambda_q$ by the fraction of $\lambda_q$ obtained from multiplying the step value by $\lambda_q$. Decreasing $\lambda_q$ has the effect of moving the operating point further to the right on convex hull 1302, where more power will be allocated and a higher rate will result. Increasing $\lambda_q$ has the effect of moving the operating point further to the left on convex hull 1302, where less power will be allocated and a lower rate will result. For the initial iteration of the bisection search, the step value is initialized to zero, so it does not matter whether task 1210 or 1212 is performed.

After task 1210 or 1212, a task 1214 initializes a subchannel index to zero and initializes the power-accumulation variable E_New to zero. Following task 1214, a programming loop is performed where the same tasks will be repeated for the different subchannels 802 assigned to this QoS region 804. Power and a bit rate will be allocated to one of these subchannels 802 in each iteration of the programming loop. This programming loop begins with a task 1216 that increments the subchannel index. In the first iteration of this programming loop, task 1216 causes a pointer to point to the first subchannel 802 assigned to the current QoS region 804.

After task 1216 a task 1218 calculates a beta (β) factor to be proportional to the current value for $\lambda_q$ and inversely proportional to the CGNR for the current subchannel 802. For a given $\lambda_q$, a greater CGNR indicates a better subchannel 802 and results in a smaller β factor. Then, a task 1220 performs a table lookup operation using the β factor and β physical channel allocation table 900. Generally, task 1220 confines its investigation to the data structure 902 corresponding to the current QoS region 804, and finds the rate associated with the closest β in table 900 to the P factor calculated above in task 1218. A beta scale factor may be applied to the β factor calculated above in task 1218 prior to the table lookup operation to bias round-off errors toward a lower rate, resulting in a greater tolerance to the bit error rate specified for the current QoS region 804.

After task 1220, a task 1222 performs another table look operation using the rate value obtained above in task 1220 and rate-SNR table 1000. Task 1222 confines its lookup operation to the data structure 1002 corresponding to the current QoS region 804, and finds the SNR associated with the specified rate for the indicated quality of signal. Once the subchannel's CGNR and $\lambda_q$ have been converted as closely possible to the theoretical rate and SNR which indicate an operating point on convex hull 1302 through the application of tasks 1218, 1220, and 1222, a task 1224 is performed. Task 1224 calculates the power-accumulation variable E_New to be the sum of the previous E_New value and $10^{(SNR/10)/CGNR}$, where SNR is the SNR obtained above in task 1222 for the subject subchannel 802, and CGNR is the CGNR of the subject subchannel 802. Those skilled in the art will appreciate that the processing time required to perform the table lookup operations of tasks 1220 and 1222, and the calculations of tasks 1218 and 1224 is quite small. Consequently, a power and rate can be allocated to a given subchannel 802 quite quickly.

Following task 1224, a query task 1226 determines whether power and rate have now been allocated for the last subchannel 802 of the current QoS region 804. If additional subchannels 802 remain, then program control loops back to task 1216 to allocate power and rate for another subchannel 802 in this QoS region 804. When task 1226 eventually encounters the final subchannel 802 of this QoS region 804, a task 1228 calculates a difference between the total power allocable in the QoS region 804, as indicated by the power-accumulation variable E_New, and the budgeted power for the QoS region 804. Moreover, task 1228 sets the step variable to be a function of this difference. For example, task 1228 may calculate the step variable to be the absolute value of this difference divided by the budgeted power for the QoS region 804. That way the step variable will represent a positive fraction of the total budgeted power that either remains to be allocated or has been over allocated.

Next, a query task 1230 determines whether the bisection search to determine the value of $\lambda_q$ that causes the region's power budget to be substantially entirely allocated in the QoS region 804 is complete. Task 1230 may investigate whether the step variable is less than a predetermined value (e.g., 0.01) and the budgeted power remains greater than the allocated power. Typically, only a few iterations of the bisection search are required before the step size becomes trivially small. Alternatively, task 1230 may simply indicate that the bisection search is complete when a predetermined number of iterations has been performed. So long as the bisection search is not yet complete, program control returns to task 1208. Task 1208 will route program control through task 1210 or 1212 as discussed above, depending upon whether the power budget has been under or over allocated. Task 1210 or 1212 will adjust the cost relationship defined by $\lambda_q$ to allocate less power in the next iteration when the power budget has been over allocated and to allocate more power when the power budget has been under allocated.

When task 1230 determines that the bisection search is complete, a task 1232 is performed. At this point, the amount of power allocated to the subchannels 802 assigned to this QoS region 804 approximately equals the power budgeted for this QoS region 804. Task 1232 saves the physical channel allocation results for this QoS region 804. Moreover, the value of $\lambda_q$ that causes the entire power budget to be allocated in this QoS region 804 has been resolved. Consequently, one element of a Lagrange multiplier vector $|\lambda|=|\lambda_{q=1}, \lambda_{q=2}, \ldots, \lambda_{q=F}|$ has been resolved.

After task 1232, a query task 1234 determines whether physical channel allocations have been determined for all QoS regions 804 specified for the subject directed QoS partition vector 1102. So long as other QoS regions 804 remain to be allocated, program control returns to task 1204, and the above-discussed process repeats for another QoS region 804. In processing the other QoS regions 804, any small amounts of power not allocated to the previous QoS region 804 may be added to the power budget for the other QoS regions.

When task 1234 eventually encounters the last QoS region 804, process 1200 is complete for the subject directed QoS partition vector 1102. At this point, the Lagrange multiplier vector |λ| has been completely resolved for the subject directed QoS partition vector 1102, and different cost relationships will have been applied in the different QoS regions 804 specified by the subject directed QoS partition vector 1102. Substantially the total power budget for communication channel 420 has been allocated to the constituent subchannels 802 of communication channel 420. And, bit rates have been specified for each of subchannels 802.

The above-discussed physical channel allocation process 1200 uses only a few calculations and table lookup operations to quickly allocate rate and power for a single subchannel 802. This allocation is repeated for all subchannels 802 in a QoS region 804, and repeated further through a few iterations of the bisection search which resolves the cost relationship $\lambda_q$ where the QoS region's power is entirely allocated. Then, the allocation process is repeated further for a few other QoS regions 804, and the process is repeated still further for a few other directed QoS partition vectors 1102. The quick allocation of rate and power to a single subchannel 802 permits all these repetitions to occur in real time while processing constant rate source information.

Figure 14:
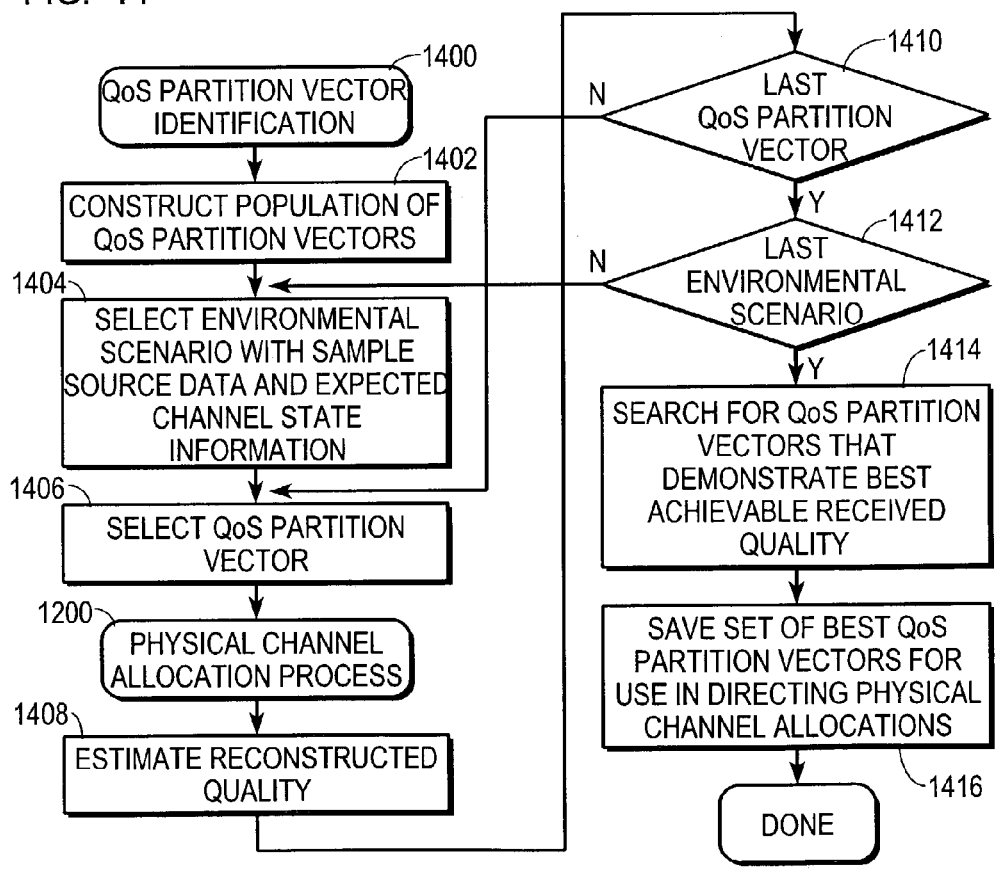
FIG. 14 shows a flow chart of a QoS partition vector identification process used to identify the directed QoS partition vectors set, an example of which is shown in FIG. 11.

FIG. 14 shows a flow chart of a QoS partition vector identification process 1400 used to identify directed QoS partition vector set 1100. Process 1400 may be performed off-line and has no influence on the real time operation of processes 700 and 1200. In other words, process 1400 may be performed at any time when no source information is to be transmitted or may be simulated in any general purpose or other computer using as much time as necessary.

Process 1400 includes a task 1402 that constructs a population of QoS partition vectors. FIG. 15 shows a block diagram of an exemplary population 1500 of QoS partition vectors 1502 from which the directed QoS partition vector set 1100 is selected. Population 1500 desirably includes many more QoS partition vectors 1502 than the number of directed QoS partition vectors 1102 included in directed QoS partition vector set 1100. FIG. 15 depicts only 66 QoS partition vectors 1502 as an example, but population 1500 may include tens or hundreds of thousands. Each QoS partition vector 1502 in population 1500 defines a unique association between a number of QoS regions 804, probabilities of error to be associated with the QoS regions 804, and numbers of subchannels 802 to be associated with the specified QoS regions 804. Desirably, the unique associations are widely dispersed. Index numbers 1506 may also be associated with each QoS partition vector 1502. Moreover, population 1500 desirably still includes fewer than all possible combinations of subchannel-to-QoS region combinations so that process 1400 remains tractable. Although not specifically detailed in FIG. 15, QoS partition vectors 1502 may include a variety of different allocations of power to different QoS regions 804, as indicated by data 1104.

Following task 1402, process 1400 performs a task 1404. Task 1404 selects an environmental scenario to process using population 1500. The environmental scenario includes source data of the type expected to be transmitted through communication system 400, such as images, voice frames, computer data, and the like. Desirably, the source information exhibits wide-spread distribution. The environmental scenario also includes sample channel state information. The channel state information desirably describes the type of channels expected to be encountered by transmission system 400. For example, some scenarios may describe the presence of interfering or jamming signals, other scenarios may describe the presence of frequency-selective fading, still others may describe unusually heavy and unusually light widespread noise, and still others may describe combinations of these factors. The selection of task 1404 is desirably made from a population of a plurality of environmental scenarios.

Following task 1404, process 1400 performs a programming loop where all QoS partition vectors 1502 in population 1500 are processed with respect to the environmental scenario, and the resulting estimated signal quality recorded for later comparisons. Thus, a task 1406 selects a single QoS partition vector 1502 from population 1500; then process 1200, or a similar process, is performed to allocate power and rates to subchannels 802 for the selected QoS partition vector 1502. Following the allocation of process 1200, a task 1408 estimates the quality of the reconstructed information, and the estimated quality is saved in association with an index number 1506 for the selected QoS partition vector 1502. After task 1408, a query task 1410 determines whether the last QoS partition vector 1502 has been processed in the programming loop. So long as additional QoS partition vectors 1502 remain for processing, program control loops back to task 1406 to process another QoS partition vector 1502.

When all QoS partition vectors 1502 have been processed for the current environmental scenario, a query task 1412 determines whether the last environmental scenario has been processed. So long as additional environmental scenarios remain to be processed, program control loops back to task 1404. When the last environmental scenario has been processed by all QoS partition vectors 1502 in population 1500, a task 1414 searches the results saved above in task 1408 for each QoS partition vector 1502 as applied to the different scenarios. Then, a task 1416 constructs and saves set 1100 of directed QoS partition vectors 1102 from selected ones of the QoS partition vectors 1502 as a result of the search conducted in task 1414. As discussed above in connection with FIGS. 7-13, the allocation of power and rates to subchannels 802 will be directed by set 1100. The use of a relatively small set 1100 of directed QoS partition vectors 1102 helps maintain the tractability of the power and rate allocation process.

Figure 3:
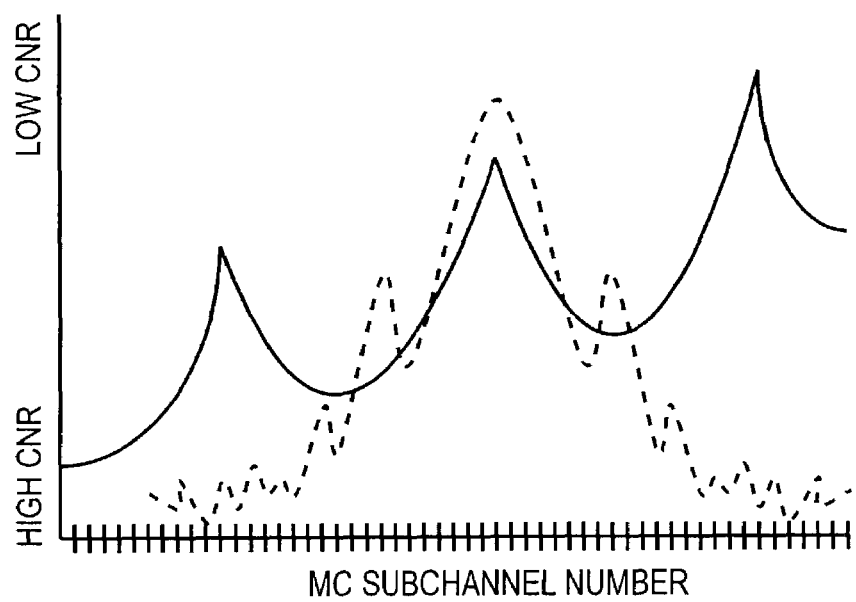
FIG. 3 shows a graph depicting two examples of the spectral content scenarios possible in a wideband physical channel prior to transmission through the channel.
Figure 16:
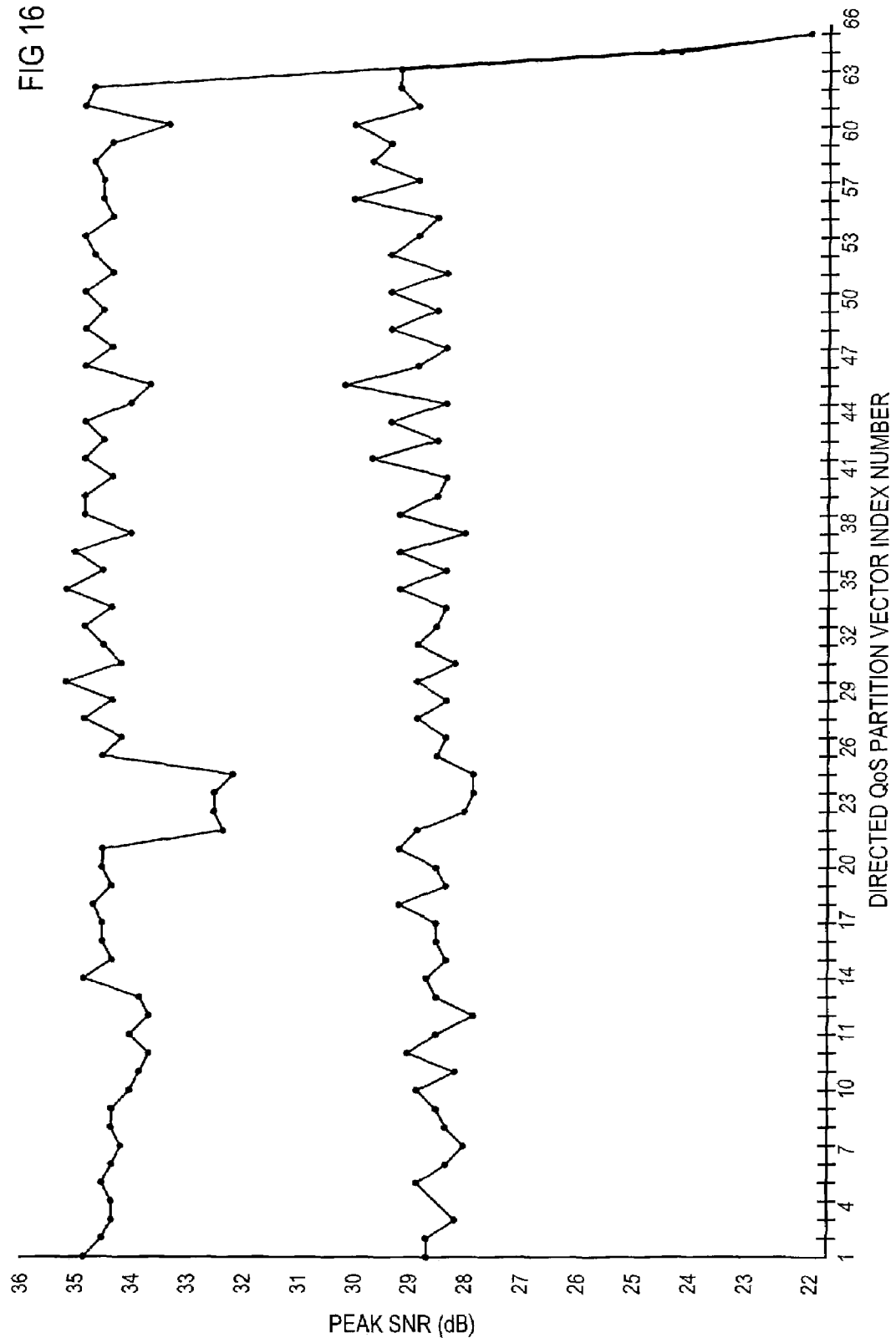
FIG. 16 shows a graph depicting estimated reconstruction performance for the population of QoS partition vectors of FIG. 15 when applied to two environmental scenarios.

FIG. 16 shows a graph depicting estimated reconstruction performance for the population 1500 of QoS partition vectors 1502 when applied to two environmental scenarios. The top trace in FIG. 16 results from source information of a single image and from channel state information describing a jamming signal. The bottom trace results from the same source information and from channel state information describing a frequency-selective fading channel. These two channel conditions are depicted in FIG. 3. Estimated reconstructed signal quality is expressed as Peak SNR. The results indicate that a few QoS partition vectors tend to demonstrate better achievable received quality over the range of environmental scenarios than the other QoS partition vectors 1502, such as the QoS partition vector 1502 with index number 42. Such QoS partition vectors that demonstrate better achievable received quality are desirably included in set 1100 of directed QoS partition vectors 1102. The results further indicate that many different QoS partition vectors 1502 actually achieve similar mediocre results in all environmental scenarios, such as the QoS partition vector 1502 with index number 18. Accordingly, some of such QoS partition vectors 1502 may be included in set 1100 for the sake of maintaining diversity, but most may be ignored. In addition, some actually achieve poor results in each environmental scenario, such as the QoS partition vectors 1502 with index numbers 22-26 and 65-66. These QoS partition vectors 1502 are desirably omitted from set 1100.

When task 1416 saves set 1100 of directed QoS partition vectors 1102, ranking numbers 1108 may be added to reflect overall rankings determined by process 1400, for use in selecting directed QoS partition vectors in process 700.

Figure 17:
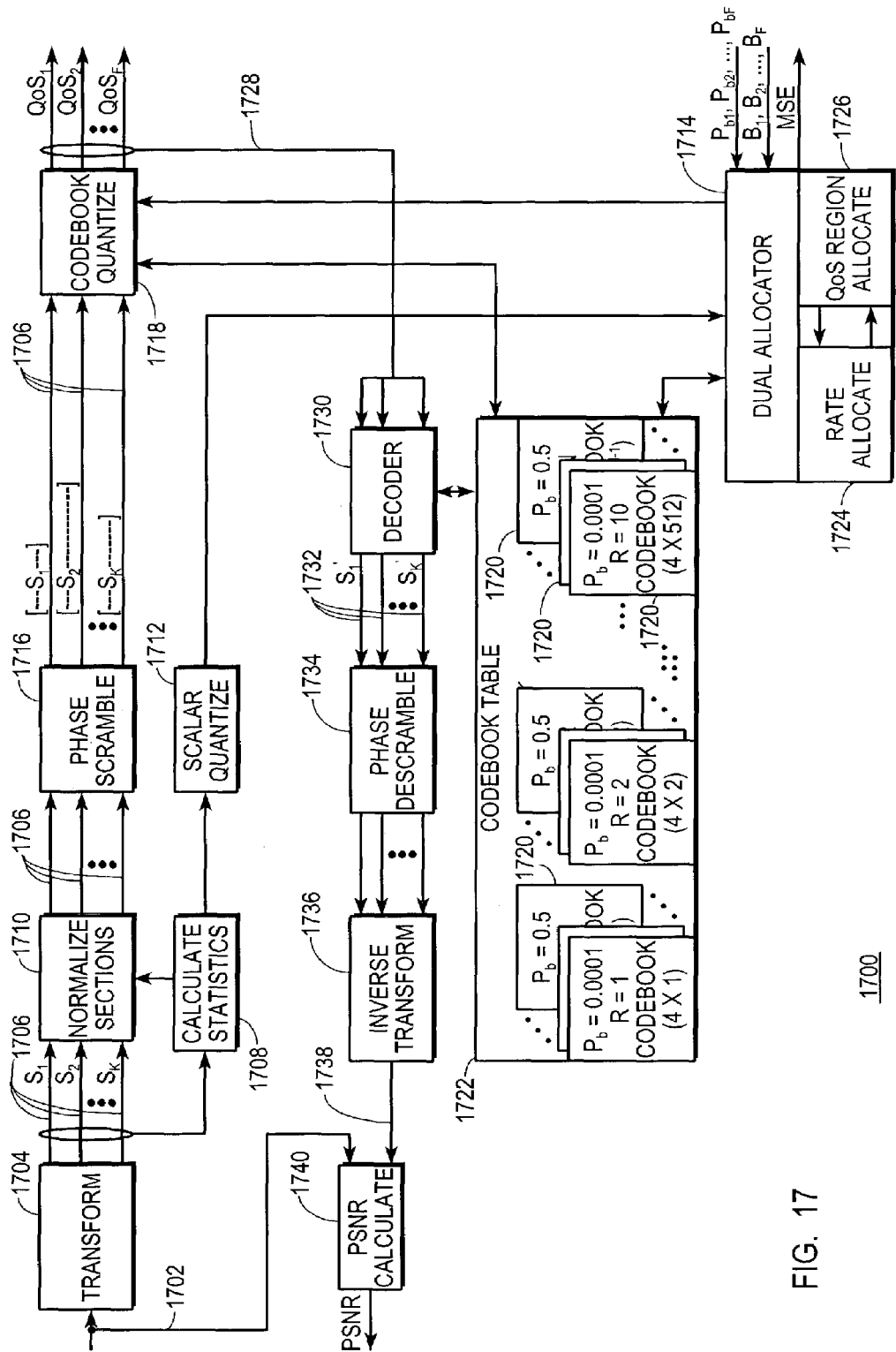
FIG. 17 shows a block diagram of a second image/video coder usable in a transmitter portion of one embodiment of the present invention.

FIG. 17 shows a block diagram of a second image/video coder 1700 usable in transmitter 402. Coder 1700 is an example of a coder that may be suitable for encoding highly compressible data, such as imagery, video, or voice. In particular, coder 1700 represents a type of coder that may jointly combine lossy compression and error correction encoding functions. A coder which follows the teaching of coder 1700 may be used for image coder 508, voice coder 512 or video coder 516.

Compressible data 1702 is applied to an input of a transform section 1704. Compressible data 1702 may be configured as voice, video, imagery or another type of source information that may tolerate lossy compression. In particular, coder 1700 operates on one block of compressible data 1702 at a time. A block of compressible data may be an image, a frame of video, a frame of sampled voice data, or the like. For constant rate data, different blocks of compressible data are repetitively supplied over time.

Transform section 1704 may take on a variety of forms well-known to those skilled in the art. For example, transform section 1704 may implement a wavelet decomposition. Thus, an input block of compressible data 1702 may be decomposed into an integer number K of data sections 1706 called subbands using a modified Mallet tree decomposition or any other suitable decomposition. A transformation into K=22 data sections 1706 at transform section 1704 would produce a reasonable number, but the absolute value of K is not critical and any number greater than two will suffice for purposes of the present invention. Depending upon the characteristics of the transform, different data sections 1706 may be defined by different numbers of samples. In other words, different data sections 1706 may have different lengths.

Alternatively, transform section 1704 may implement a 2-D discrete cosine transform (DCT). In the DCT example, it would be reasonable to divide an input block of compressible data 1702 into non-overlapping 8×8 blocks in transform section 1704, but the size of the block is not critical. If 8×8 blocks are used, then K=64 data sections 1706 configured as sequences of like-coefficients would be produced by transform section 1704. In this example, each data section 1706 would have the same number of samples.

Furthermore, transform section 1704 may implement region-of-interest (ROI) processing that applies different classifications to various ones of data sections 1706. One common ROI technique uses manual or automated techniques to construct a mask that specifies the importance of different pieces of input compressible data 1702. In a common implementation, some areas of input compressible data 1702 are specified to be regions of interest and classified as being "targets" while the remaining areas are classified as being "background." The targets are to be communicated with greater resolution than the background. Using wavelet decomposition into 22 subbands and only two region-of-interest classes (i.e., target and background), for example, K would equal 44, with 22 data sections 1706 being classified as target data sections 1706 and 22 as being background data sections 1706. Likewise, in a DCT example using 8×8 blocks and only two region-of-interest classes, K would equal 128, with 64 data sections 1706 being classified as target data sections 1706 and 64 as being background data sections 1706. All these and other types of transformations and decompositions known to those skilled in the art may be implemented in transform section 1704.

Data sections 1706 are passed to a calculate statistics block 1708, and a normalize sections block 1710. In calculate statistics block 1708, the statistics of each data section 1706 are computed, and in normalize sections block 1710 all data sections 1706 are normalized to zero mean and unit variance. Statistics from calculate statistics block 1708 are quantized in a scalar quantize block 1712, then passed to a dual allocator 1714, which is discussed below in more detail. The now-normalized data sections 1706 are passed from normalize sections block 1710 through an optional phase scrambler 1716 where they may be all-pass filtered. After filtering, data sections 1706 pass to a codebook quantizer 1718. In a preferred embodiment, a fixed-rate trellis coded quantizing (TCQ) system is implemented by codebook quantizer 1718, but other types of codebook quantization may be implemented as well. Those skilled in the art will appreciate that codebook quantizers use one or more codebooks to encode the data presented to the quantizer. Generally, encoding is performed by substituting codes from the codebook for data sequences presented to the quantizer.

In coder 1700, codebook quantizer 1718 uses codebooks 1720 selected from a codebook table 1722 in performing its quantization. In particular, for each of the K data sections 1706, the data section samples are converted into codes using the single codebook 1720 that has been configured for an encoding rate and a bit-error-rate that has been associated with that data section 1706. Dual allocator 1714 couples to codebook quantizer 1718 and performs the association of the dual features: 1) encoding rate to data sections 1706, and 2) bit-error-rate to data sections 1706, that codebook quantizer 1718 uses in performing its encoding operation.

Codebooks 1720 are calculated off-line, at a time before compressible data 1702 is applied to coder 1700, and downloaded into codebook table 1722 for real-time use as needed by coder 1700. Codebooks 1720 are calculated using theoretical parameters not related to any single particular set of data that will be encoded by coder 1700. Codebooks 1720 include at least two items of data for each coding sequence. One item is the code that will substitute for a sequence of input data, and the other item is an indication of distortion, e.g., mean-square error (MSE). In the preferred embodiments, codebooks 1720 are included for a variety of different encoding rates and a variety of different bit error probabilities ($P_b$). The different bit error probabilities are associated with different QoS regions 804. Thus, for each block of compressible input data 1702, a variety of codebooks 1720 configured for a variety of different rates and a variety of different bit error probabilities are used. FIG. 17 depicts encoding bit rates ranging from 1 to 10 and bit-error-rates ranging from 0.0001 to 0.5 as an example of encoding bit rate and bit-error-rate ranges that are reasonable, but these ranges are not requirements of the present invention. Codebooks 1720 are devised to operate with a given codebook quantization technique. In the preferred embodiments of the present invention, any known techniques for forming codebooks 1720 that are compatible with codebook quantizer 1718 may be used. One example of such a technique that is useful for a channel-optimized TCQ system is taught in "*Communication System And Method For Multi-Rate, Channel-Optimized Trellis-Coded Quantization*", by Glen P. Abousleman, Ser. No. 09/478,058, filed 5 Jan. 2000, which is incorporated herein by reference.

Dual allocator 1714 also couples to codebook table 1722. Dual allocator 1714 performs a rate-allocation process 1724 and a QoS-region-allocation process 1726. Processes 1724 and 1726 work together in an iterative fashion in a manner discussed in more detail below to allocate a bit encoding rate and a QoS region 804 to each data section 1706. Rate-allocation process 1724 may use MSE data from codebooks 1720 to allocate different rates to different data sections 1706. In one embodiment, dual allocator 1714 outputs a cumulative MSE value for use in VQoS joint source-modulation coding process 700 at tasks 712 and 716 to identify the QoS partition vector 1102 which yields the best results. Processes 1724 and 1726 also rely upon the physical channel allocation results provided by task 710 in VQoS joint source-modulation coding process 700. As discussed above, task 710 provides, as a minimum, an indication of the value of the integer F of different QoS regions 804, the bit-error-rates $P_{b1}$-$P_{bF}$ associated with each of the F QoS regions 804, and the total number of bits $B_1$-$B_F$ that may be transmitted through each of the F QoS regions 804. For each repetition of task 710, as discussed above, different QoS regions 804 are defined for dual allocator 1714.

Codebook quantizer 1718 outputs F streams of encoded data 1728, one for each QoS region 804. Together, the F streams of encoded data 1728 provide a compressed and encoded block of data that corresponds to the input block of compressible data 1702. Streams of data 1728 may, for example, be routed to switch 518. The compressed and encoded block of data is then modulated and applied to subchannels 802 of communication channel 420 as discussed above.

In one embodiment, the F streams of encoded data 1728 are also applied to a decoder 1730 configured to implement the complementary function to codebook quantizer 1718. Decoder 1730 then outputs K regenerated data sections 1732. The K regenerated data sections 1732 are phasedescrambled in a phase descrambler 1734 if necessary and passed to an inverse transform block 1736. Inverse transform block 1736 performs the complementary function to transform 1704 and generates a regenerated block of compressible data 1738. Regenerated block of compressible data 1738 should be identical to the original input block of compressible data 1702, except for losses caused by the lossy compression implemented by coder 1700. A PSNR calculation block 1740 compares original input block of compressible data 1702 and regenerated block of compressible data 1738 to produce a PSNR value. The PSNR value represents a more accurate estimate of quality level for use by VQoS joint source-modulation coding process 700 than may be obtained by MSE.

While coder 1700 represents a basic coder consistent with the teaching of the present invention, those skilled in the art will appreciate that additional features may be added without departing from the scope of the present invention. For example, motion or other time-dependent features may be implemented to characterize intra- and inter-frame coding so that significant amounts of compression are achieved for constant rate data.

Figure 18:
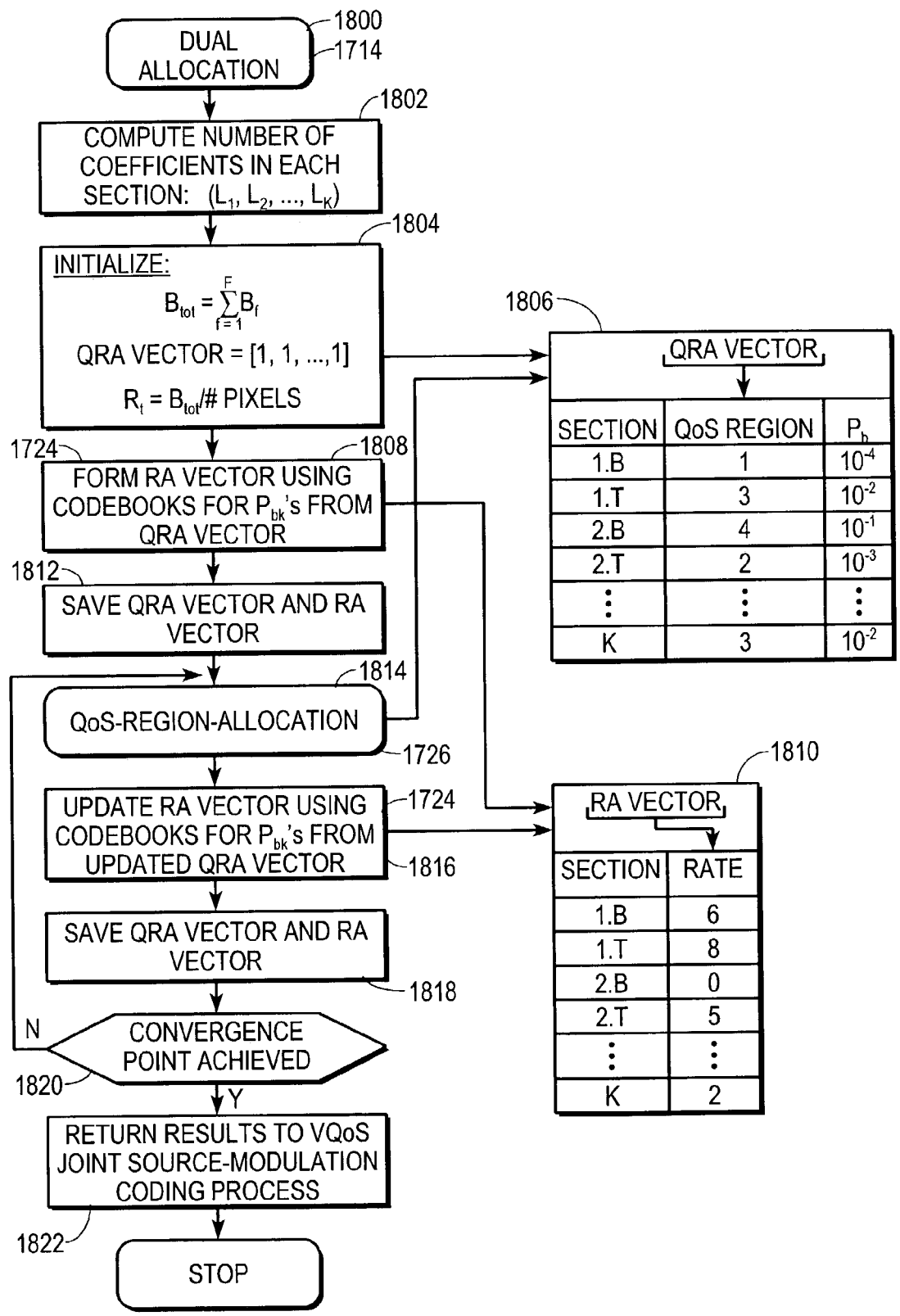
FIG. 18 shows a flow chart of a dual allocation process used by the coder of FIG. 17.

FIG. 18 shows a flow chart of a dual allocation process 1800 used by coder 1700, and particularly by dual allocator 1714. Process 1800 implements various tasks under the control of a software program in a manner well known to those skilled in the art. This software program, as well as the tables, variables, and other data structures used by the program, may be stored in a memory (not shown). Process 1800 may be implemented using a digital signal processor or other processor- or microprocessor-based circuit structures, and may share the circuit structure with other components of transmitter 402.

Process 1800 includes a task 1802 that computes the number of coefficients in each data section 1706. In particular, task 1802 may form a vector $[L_1, L_2, \ldots, L_K]$ listing the length of each of the K data sections 1706.

Next, further initialization is performed in an initialization task 1804. Task 1804 calculates the total number of bits ($B_{tot}$) that can be allocated for the current QoS partition vector 1102 having bit capacities $[B_1, B_2, \ldots, B_F]$ allocated to the F QoS regions 804 defined for the current QoS partition vector 1102. The total number of bits is calculated simply by summing the bit capacities over all F QoS regions 804.

In addition, task 1804 initializes a QoS region allocation (QRA) vector 1806 to $[1, 1, \ldots, 1]$. QRA vector 1806 is configured to have K elements, one for each of the K data sections 1706. But FIG. 18 does not depict this initial allocation for QRA vector 1806. Rather, FIG. 18 depicts QRA vector 1806 as having the different arbitrary assignment of $[1, 3, 4, 2, \ldots, 3]$, which represents one example of how the initial allocation may be subsequently updated through the operation of process 1800. In addition, FIG. 18 depicts data sections 1706, for which elements of vector 1806 are provided, in the form of a coefficient to the left of a decimal point and an ROI status classification indicator of either a "B" or a "T" to the right of the decimal point. The status classification indicator "B" signifies a background area and a "T" indicator signifies a target area. When ROI status classification is present, then if $K_1$ equals the number of data sections present in one class and $K_2$ equals the number of data sections present in a second class, then $K_1+K_2 \leq K$. But those skilled in the art will appreciate that nothing requires ROI processing, and that data sections 1706 may alternatively be configured without any ROI status classification. Alternatively, more than two ROI classes may be specified.

For this initial allocation of task 1804, each element of QRA vector 1806 is set to a "1". The value "1" is an arbitrary identifier that identifies the QoS region 804 having the lowest or best bit-error-rate ($P_b$). For the example presented in FIG. 8 and repeated in FIG. 18, the lowest bit-error-rate is $10^{-4}$, and this bit-error-rate is associated with a QoS region 804 identified as region 1. This particular initialization task represents an initial QoS region allocation to the K data sections 1706. In this initial allocation of QRA vector 1806, no prior rate allocation of encoding bit rates to the K data sections 1706 needs to have taken place. Moreover, the allocation of the "best" QoS region 804 to each data section 1706 forces QoS-region-allocation process 1726 to allocate the most important data sections 1706 to the QoS region 804 having the lowest bit-error-rate. Allocating more important data sections 1706 to better QoS regions 804 better matches data sections with QoS regions and yields a more efficient allocation.

Initialization task 1804 also defines the total average rate ($R_t$) to be achieved in the subsequent allocations of data sections 1706 to QoS regions 804 and encoding bit rates. When no ROI classification is present, $R_t$ is defined to be the total number of bits $B_{tot}$ divided by the number of pixels, or other elemental quantum of data presented in input block of compressible data 1702. When ROI classification is present, total average rates may be specified separately for each classification. Thus, the number of bits for target and background for two ROI classes can be specified separately, where $R_{tT}$ is defined to be the total number of bits $B_{totT}$ allocated to targets divided by the total number of pixels, and $R_{tB}$ is defined to be the total number of bits $B_{totB}$ allocated to the background divided by the total number of pixels.

Following task 1804, a task 1808 performs rate-allocation process 1724 to form a rate allocation (RA) vector 1810. Rate-allocation process 1724 uses the codebooks 1720 that have bit-error-rates ($P_b$'s) defined by the QRA vector 1806 initialized above in task 1804. In task 1808, only codebooks 1720 having the same $P_b$ are used, and that $P_b$ is the $P_b$ defined for the best QoS region 804. In subsequent performances of rate-allocation process 1724, that will not be the case. Rate allocation may be performed using a single rate allocation for $R_t$ if no ROI classification is present, or separately for $R_{tT}$ and $R_{tB}$ if ROI classification is present.

Rate-allocation process 1724 may follow any conventional rate allocation procedure. One suitable procedure may be described as follows.

To allocate the specified bit rate among data sections 1706, the overall MSE incurred by encoding the sequences using codebook quantizer 1718 at an average rate of $R_t$ bits/coefficient is represented by:

$$E_s = \sum_{i=1}^{K} \alpha_i \sigma_i^2 E_{i,f}(r_i), \qquad \text{EQ 7}$$

where $\sigma_i^2$ is the variance of sequence i, $E_{i,f}(r_i)$ for $1 \leq i \leq K$ and $1 \leq f \leq F$ denotes the rate-distortion performance of the $f^{th}$ quantizer (i.e., the quantizer assigned to the bit-error-rate $P_{bf}$ of the $f^{th}$ QoS region 804) at $r_i$ bits/sample, K is the number of data sections 1706, and $\alpha_i$ is a weighting coefficient to account for the variability in data section length $L_k$. For a 22-data section decomposition with no ROI processing, K=22.

The rate allocation (RA) vector 1810 $[r_1, r_2, \ldots, r_K]$ is chosen such that $E_s$ is minimized, subject to an average rate constraint, as follows:

$$\sum_{i=1}^{K} \alpha_i r_i \leq R_T \text{ bits/coefficient} \qquad \text{EQ 8}$$

The solution vector RA*$(r_1^*, r_2^*, \ldots, r_K^*)$, to the unconstrained problem, $$\min RA \left\{ \sum_{i=1}^{K} (\alpha_i \sigma_i^2 E_{i,f}(r_i) + \lambda \alpha_i r_i) \right\} \qquad \text{EQ 9}$$

minimizes $E_s$ subject to $$\sum_{i=1}^{K} \alpha_i r_i \leq \sum_{i=1}^{K} \alpha_i r_i^*. \qquad \text{EQ 10}$$

Thus, to find a solution to the constrained problem of EQ 7 and EQ 8, it suffices to find $\lambda$ such that the solution to EQ 9 yields:

$$\sum_{i=1}^{K} \alpha_i r_i^* \leq R_T. \qquad \text{EQ 11}$$

A bisection search may be performed for the $\lambda$ corresponding to the required RA vector. For a given $\lambda$, the solution to the unconstrained problem is obtained by minimizing each term of the sum in EQ 9 separately. If $S_f$ is the set of allowable rates for the $f^{th}$ quantizer, and $r_i^*$ is the $i^{th}$ component of the solution vector RA*, then $r_i^*$ solves $$\min r_i \in S_f \{\alpha_i \sigma_i^2 E_{i,f}(r_i) + \lambda \alpha_i r_i\} \qquad \text{EQ 12}$$

Accordingly, as a result of performing rate-allocation process 1724, RA vector 1810 is formed causing each of the K data sections 1706 to be assigned an encoding bit rate.

Next, a task 1812 saves the initial QRA vector 1806 and RA vector 1810 for use in making comparisons with updated versions of vectors 1806 and 1810. Then, a task 1814 performs QoS-region-allocation process 1726 to update QRA vector 1806 from its previous state. This time, QRA vector 1806 is updated in response to the most current version of RA vector 1810.

Figure 19:
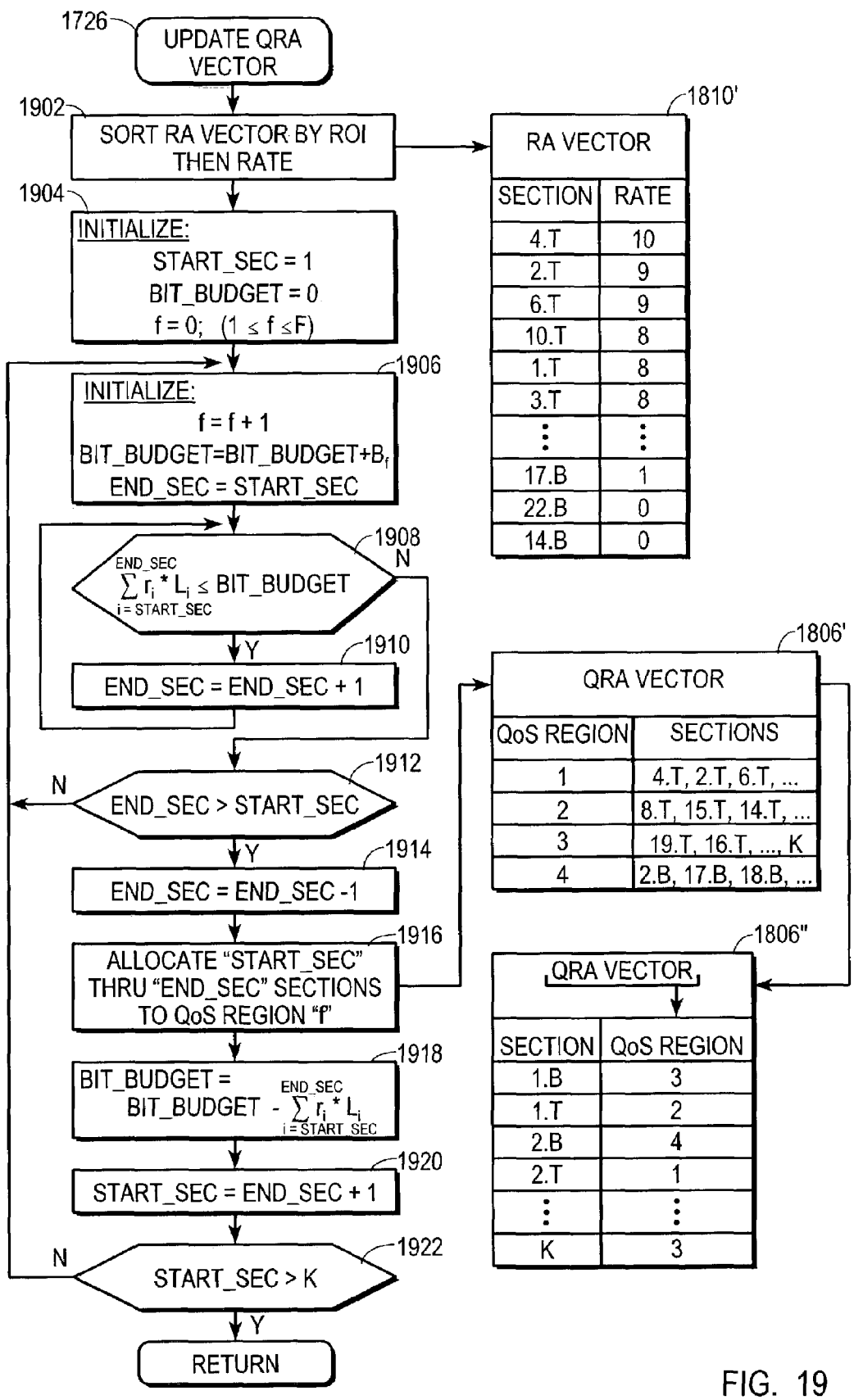
FIG. 19 shows a flow chart of a QoS-region-allocation process used by the process of FIG. 18.

FIG. 19 shows a flow chart of a QoS-region-allocation process 1726 that may be performed at task 1814. Process 1726 performs a task 1902 to sort RA vector 1810. In the preferred embodiment, RA vector 1810 is sorted first by ROI status classification, then by encoding bit rate to produce a ranked order for data sections 1706, as indicated in a sorted RA vector 1810'. The ROI status classification causes all target, or region-of-greater-interest, data sections 1706 to be placed first in RA vector 1810', and all background, or region-of-lesser-interest, data sections 1706 to be placed last in RA vector 1810'. Within each ROI status grouping, data sections 1706 with greater encoding bit rates are placed before data sections 1706 with lesser rates. But, nothing requires ROI status classification, and nothing requires only target and background classes if ROI status classification is present. If ROI status classification is not present, then task 1902 simply sorts RA vector 1810 by rate, from greatest to least. The sorting by ROI status and rate will cause the most important data sections 1706 to be allocated to the best QoS regions 804.

After task 1902, a first initialization task 1904 sets some variables to initial values. For example, a variable "START_SEC" is used to indicate a starting data section 1706 with respect to the ranked order of sorted RA vector 1810' and is set to 1. A variable "BIT_BUDGET" is used to indicate a total number of bits that can be allocated to a QoS region 804 currently being processed. The BIT_BUDGET variable is initialized to 0 in task 1902. And, a variable "f" is an index indicating the QoS region 804 currently being processed. The variable f is initialized to 0 but will be incremented to signify QoS regions 1 through F.

A programming loop is entered following task 1904. Each iteration of this programming loop processes another QoS region 804. Within the programming loop, a second initialization task 1906 increments the variable f to index the next QoS region 804. In the first iteration of the programming loop, f=1, indicating the QoS region 804 having the lowest bit-error-rate. In addition, the BIT_BUDGET variable is increased by the number of bits $B_f$ for this QoS region 804. The number of bits $B_f$ represents one of the parameters passed to dual allocator 1714 by process 700, as discussed above. In addition, a variable "END_SEC" is used to indicate an ending data section 1706 with respect to the ranked order of sorted RA vector 1810', but is set to the START_SEC variable here.

After task 1906, a query task 1908 determines whether all rates specified in sorted RA vector 1810', for all data sections 1706 between the START_SEC and END_SEC limits inclusive, when applied to all coefficients for those data sections 1706, are less than the BIT_BUDGET quantity. So long as this amount remains less than or equal to the BIT_BUDGET, a task 1910 increments the END_SEC variable and task 1908 repeats. Eventually, the END_SEC variable is set to a level where too many data sections 1706 are specified for the data in those data sections 1706 to be entirely conveyed by the current QoS region 804. When this happens, a query task 1912 is performed.

Task 1912 determines whether the END_SEC variable is greater than the START_SEC variable. When END_SEC is greater, at least one data section 1706 may be allocated to the currently specified QoS region 804. In this situation, a task 1914 decrements END_SEC to point to the last data section 1706 that can be entirely allocated to the current QOS region 804, and a task 1916 allocates the specified data sections 1706 to the $f^{th}$ QoS region. In particular, all data sections 1706 between START_SEC and END_SEC, inclusive, as specified by the ranked order of sorted RA vector 1810', are assigned to a QoS region 804 as indicated in an intermediate QRA vector 1806'. As denoted in intermediate QRA vector 1806' by data sections "4.T" and "2.T" being allocated to QoS region "1", data sections 1706 having different encoding bit rates specified by RA vector 1810' may be assigned to the same QoS region 804.

Following task 1916, a task 1918 adjusts the BIT_BUDGET by removing the total bits just allocated in the current QoS region 804. The residual BIT_BUDGET remaining following task 1918 represents a bit rate insufficient to entirely cover the needs of the next-highest priority data section 1706, while proceeding in ranked order. Then, a task 1920 adjusts the START_SEC variable to point to the highest priority data section 1706 remaining in sorted RA vector 1810 to be allocated to a QoS region 804, and a query task 1922 tests whether all data sections 1706 from sorted RA vector 1810 have been allocated yet. So long as additional data sections 1706 remain to be allocated, program control loops back to task 1906. Likewise, when query task 1912 determines that a QoS region 804 has insufficient capacity to convey even one data section 1706, program control loops back to task 1906. But this condition represents the trivial situation where a QoS region 804 is defined by process 700 to have no or nearly no capacity. Zero capacity QoS regions 804 may be ignored because they do not actually exist, and nearly-zero-capacity QoS regions 804 are undesirable because they lead to inefficient allocations. Accordingly, such situations should be extremely rare or non-existent. Program control will remain in the programming loop until all data sections 1706 have been allocated to QoS regions 804, at which point programming control will exit process 1726.

Upon the completion of QoS-region-allocation process 1726, each of the F QoS regions are associated with at least one of K data sections. If ROI status classification is present, data sections 1706 having regions-of-greater-interest are assigned to QoS regions having lower bit-error-rates, while data sections 1706 having regions-of-lesser-interest are assigned to QoS regions having higher bit-error-rates. Within each ROI classification, if present, data sections 1706 having higher encoding bit rates are assigned to QoS regions 804 having lower bit-error-rates, and data sections 1706 having lower encoding bit rates are assigned to QoS regions 804 having higher bit-error-rates. FIG. 19 depicts an updated QRA vector 1806" after the completion of process 1726. Updated QRA vector 1806" includes the listing of K QoS-region identifiers, presented in a predetermined order, as allocated by the various iterations of task 1916.

Referring back to FIG. 18, after task 1814 performs QoS-region-allocation process 1726, a task 1816 performs rate-allocation process 1724 to update RA vector 1810. But this time, process 1724 uses the codebooks for $P_{bK}$'s from the just-updated QRA vector 1806". Process 1724 is performed as discussed above.

Following task 1816, a task 1818 saves the most recent updated QRA vector 1806. In addition, the overall MSE, as provided by $E_s$ in EQ 7, may be saved for comparison purposes or for passing back to process 700. Then, a query task 1820 is performed to determine whether a convergence point has been reached. Those skilled in the art may devise a variety of convergence points to test at task 1820. In the preferred embodiment, the convergence point is achieved when RA vectors 1810 and QRA vectors 1806 do not change from iteration to iteration of tasks 1814 and 1816. So long as the previous RA and QRA vectors 1810 and 1806 do not match the most current updates of RA and QRA vectors 1810 and 1806, program control loops back to task 1814 to repeat rate-allocation process 1724 and QoS-region-allocation process 1726 until the convergence point is achieved. At this point MSE should be at a local minimum.

When the convergence point has been achieved, a task 1822 returns the results of dual allocation process 1800 to VQoS joint source-modulation coding process 700, where these results are obtained at task 712 and later evaluated at task 716 to select a best QoS partition vector 1102. In one embodiment of the present invention, the resulting RA vector 1810 and QRA vector 1806 from dual allocation process 1800 may be used by codebook quantizer 1718 to convert data sections 1706 into codes supplied in F streams of encoded data 1728. For each data section 1706, quantization takes place using the codebook 1720 within codebook table 1722 that has a rate specified by an element in RA vector 1810 and the bit-error-rate specified by a corresponding element in QRA vector 1806. The results of quantization by codebook quantizer 1718 may then be saved for possible transmission later and for use in a PSNR calculation. When a PSNR calculation is to be performed, the PSNR calculation may be performed through PSNR calculate block 1740, and the result may be returned to process 700.

In another embodiment, no quantization by codebook quantizer 1718 needs to be performed until task 716 of process 700 selects a best QoS partition vector 1102. In this embodiment, task 1822 may simply return the overall MSE results from the most recent iteration of rate-allocation process 1724 to process 700.

In summary, the present invention provides an improved method and apparatus for encoding compressible data for transmission over a variable quality communication channel. The apparatus and method of the invention as configured in the preferred embodiments employ an unconstrained multi-carrier (MC) allocation algorithm so that the allocation problem is tractable. The apparatus and method of the invention as configured in the preferred embodiments compress and encode data for application to a communication channel in which subchannels have been grouped together into more than one quality-of-signal (QoS) region, where each QoS region exhibits a unique bit-error-rate.

Although the preferred embodiments of the invention have been illustrated and described in detail, it will be readily apparent to those skilled in the art that various modifications may be made therein without departing from the spirit of the invention or from the scope of the appended claims. For example, those skilled in the art will appreciate the precise sequencing or partitioning of tasks as indicated in flow charts presented herein represents only some of many different equivalent ways of achieving the same things.

What is claimed is:

1. A method of encoding compressible data for transmission through a communication channel comprising:
   transforming a block of said compressible data into K data sections, where K is an integer greater than one;
   identifying F different bit-error-rates associated with F quality-of-signal (QoS) regions of said communication channel, where F is an integer greater than one;
   associating each of said F QoS regions with at least one of said K data sections by:
      performing a rate-allocation process in which each of said K data sections is assigned an encoding rate;
      sorting said K data sections by said encoding rates assigned thereto to produce a ranked order of said K data sections; and
      performing a QoS-region-allocation process in which said K data sections are assigned to said F QoS regions in substantially said ranked order; and
   converting each of said K data sections into codes using a codebook configured for the bit-error-rate associated with the data section.

2. A method as claimed in claim 1 wherein said associating activity comprises:
   performing a rate-allocation process in which each of said K data sections is assigned an encoding rate;
   performing a QoS-region-allocation process in which each of said K data sections is assigned to one of said F QoS regions; and repeating said rate-allocation and QoS-region-allocation processes until a convergence point is achieved.

3. A method as claimed in claim 2 wherein:

said QoS-region-allocation process assigns each of said K data sections to one of said F QoS regions in response to a rate allocation vector produced by said rate-allocation process;

said rate-allocation process assigns each of said K data sections an encoding rate in response to a QoS region allocation vector produced by said QoS-region-allocation process; and a first repetition of said rate-allocation process uses a QoS region allocation vector in which all of said K data sections are assigned to the one of said QoS regions having the lowest bit-error-rate.

4. A method as claimed in claim 1 wherein said QoS-region-allocation process assigns data sections having higher encoding rates to QoS regions having lower bit-error-rates.

5. A method as claimed in claim 1 wherein said associating activity comprises:

performing a rate-allocation process in which each of said K data sections is assigned an encoding rate; and performing a QoS-region-allocation process in which said K data sections are assigned to said F QoS regions so that ones of said data sections to which different encoding rates have been assigned are assigned to the same QoS region.

6. A method of encoding compressible data for transmission through a communication channel wherein said compressible data is an image having at least one region of interest, and said method comprises:

transforming a block of said compressible data into K data sections, where K is an integer greater than one, and wherein said transforming activity is configured so that said K data sections include $K_1$ data sections transformed from said at least one region of interest and $K_2$ data sections transformed from other than said region of interest, where $K_1$ and $K_2$ are integers, and $K_1+K_2 \leq K$;

identifying F different bit-error-rates associated with F quality-of-signal (QoS) regions of said communication channel, where F is an integer greater than one;

associating each of said F QoS regions with at least one of said K data sections, said associating activity comprising:

performing a rate-allocation process in which each of said K data sections is assigned an encoding rate;

sorting said K data sections by region of interest to produce a ranked order of said K data sections; and performing a QoS-region-allocation process in which said K data sections are assigned to said F QoS regions in said ranked order; and converting each of said K data sections into codes using a codebook configured for the bit-error-rate associated with the data section.

7. A method as claimed in claim 6 wherein said QoS-region-allocation process assigns said $K_1$ data sections transformed from said at least one region of interest to QoS regions having lower bit-error-rates and assigns said $K_2$ data sections transformed from other than said at least one region of interest to QoS regions having higher bit-error-rates.

8. A method as claimed in claim 7 wherein:

said sorting activity further sorts said $K_1$ data sections transformed from said at least one region of interest by said encoding rates assigned thereto;

said sorting activity further sorts said $K_2$ data sections transformed from other than said at least one region of interest by said encoding rates assigned thereto;

within said $K_1$ data sections transformed from said at least one region of interest, said QoS-region-allocation process assigns data sections with higher encoding rates to QoS regions having lower bit-error-rates; and within said $K_2$ data sections transformed from other than said at least one region of interest, said QoS-region-allocation process assigns data sections with higher encoding rates to QoS regions having lower bit-error-rates.

9. A method of encoding compressible data for transmission through a communication channel comprising:

transforming a block of said compressible data into K data sections, where K is an integer greater than one;

identifying F different bit-error-rates associated with F quality-of-signal (QoS) regions of said communication channel, where F is an integer greater than one;

associating each of said F QoS regions with at least one of said K data sections;

converting each of said K data sections into codes using a codebook configured for the bit-error-rate associated with the data section, wherein said converting activity produces a compressed and encoded block of data;

decoding said compressed and encoded block of data to produce regenerated data sections;

inversely transforming said regenerated data sections to produce a regenerated block of said compressible data; and calculating an estimate of quality in response to said block of said compressible data and said regenerated block of said compressible data, wherein said decoding, inversely transforming, and calculating activities occur prior to transmission of said block of said compressible data through said communication channel.

10. A method as claimed in claim 9 additionally comprising:

repeating said identifying, associating, converting, decoding, inversely transforming, and calculating activities using different QoS regions; and transmitting said block of said compressible data through said communication channel using the QoS regions for which said calculating activity calculated the best estimate of quality.

11. A method as claimed in claim 1 wherein:

said associating activity estimates a quality level to be achieved in associating said F QoS regions with said K data sections;

said method additionally comprises repeating said identifying activity to obtain different QoS regions and said associating activity to associate said different QoS regions with said K data sections and to estimate said quality level to be achieved for said different QoS regions; and said method additionally comprises transmitting said block of said compressible data through said communication channel using the QoS regions for which said associating activity estimated the best quality level.

12. A method as claimed in claim 1 wherein said communication channel has a plurality of subchannels and said identifying activity comprises:

obtaining channel state information for said communication channel, said channel state information indicating deviation in channel-gain-to-noise ratio (CGNR) throughout said subchannels of said communication channel; and grouping said subchannels into said F QoS regions in response to said channel state information and a cost relationship between transmission rate and transmission power, said cost relationship varying over said different QoS regions.

13. An encoding apparatus configured to encode compressible data for transmission through a communication channel having a plurality of subchannels, said encoding apparatus comprising:

a transformer for transforming said compressible data into K data sections, where K is an integer greater than one;

a channel allocator configured to group said subchannels together into F QoS regions, where each QoS region has a unique bit-error rate associated therewith and includes at least one subchannel, and F is an integer greater than one;

a dual allocator, coupled to said transformer and said channel allocator, said dual allocator being configured to associate each of said F QoS regions with at least one of said K data sections, wherein said dual allocator is further configured to perform a rate-allocation process in which each of said K data sections is assigned an encoding rate, to sort said K data sections by said encoding rates assigned thereto to produce a ranked order of said K data sections, and to perform a QoS-region-allocation process in which said K data sections are assigned to said F QoS regions in substantially said ranked order; and a quantizer, coupled to said dual allocator, configured to convert each of said K data sections into codes using a codebook configured for the bit-error-rate associated with the data section by said dual allocator.

14. An encoding apparatus as claimed in claim 13 wherein said dual allocator is further configured to perform a rate-allocation process in which each of said K data sections is assigned an encoding rate, to perform a QoS-region-allocation process in which each of said K data sections is assigned to one of said F QoS regions, and to repeat said rate-allocation and QoS-region-allocation processes until a convergence point is achieved.

15. An encoding apparatus as claimed in claim 14 wherein said dual allocator is further configured so that:

said QoS-region-allocation process assigns each of said K data sections to one of said F QoS regions in response to a rate allocation vector produced by said rate-allocation process;

said rate-allocation process assigns each of said K data sections an encoding rate in response to a QoS region allocation vector produced by said QoS-region-allocation process; and a first repetition of said rate-allocation process uses a QoS region allocation vector in which all of said K data sections are assigned to the one of said QoS regions having the lowest bit-error-rate.

16. An encoding apparatus as claimed in claim 13 wherein said QoS-region-allocation process assigns data sections having higher encoding rates to QoS regions having lower bit-error-rates.

17. An encoding apparatus as claimed in claim 13 wherein:

said dual allocator is further configured to estimate a quality level to be achieved in associating said F QoS regions with said K data sections;

said channel allocator is configured to repetitively group said subchannels into different QoS regions;

said dual allocator is further configured to repetitively associate said different QoS regions with said K data sections and to repetitively estimate said quality level to be achieved for said different QoS regions; and said channel allocator is further configured to select the grouping of QoS regions for which said the best quality level was estimated by said dual allocator and to cause said compressible block of data to be transmitted through said communication channel using said selected grouping of QoS regions.

18. An encoding apparatus as claimed in claim 13 wherein said channel allocator is configured to obtain channel state information for said communication channel, said channel state information indicating deviation in channel-gain-to-noise ratio (CGNR) throughout said subchannels of said communication channel and to group said subchannels into said F QoS regions in response to said channel state information and a cost relationship between transmission rate and transmission power, said cost relationship varying over said different QoS regions.

19. A method of allocating compressible data to subchannels in a transmitter which employs multi-carrier modulation, said method comprising:

obtaining channel state information for a communication channel that includes a plurality of subchannels, said channel state information indicating deviation in channel-gain-to-noise ratio (CGNR) throughout said communication channel;

grouping said subchannels into a number F of quality-of-signal (QoS) regions in response to said channel state information, wherein each of said F QoS regions has a unique bit-error-rate associated therewith;

transforming a block of said compressible data into K data sections, where K is an integer greater than one;

associating each of said F QoS regions with at least one of said K data sections by:

performing a rate-allocation process in which each of said K data sections is assigned an encoding rate;

sorting said K data sections by said encoding rates assigned thereto to produce a ranked order of said K data sections; and performing a QoS-region-allocation process in which said K data sections are assigned to said F QoS regions in substantially said ranked order;

converting said at least one of said K data sections associated with each of said F QoS regions into codes using a codebook configured for the bit-error-rate associated with the QoS region so that each code is configured for one of said unique bit-error-rates; and for each of said codes converted from said K data sections, modulating said code into one of said subchannels from the QoS region having the unique bit-error-rate for which said code is configured.

20. A method as claimed in claim 19 wherein said associating activity comprises:

performing a rate-allocation process in which each of said K data sections is assigned an encoding rate;

performing a QoS-region-allocation process in which each of said K data sections is assigned to one of said F QoS regions; and repeating said rate-allocation and QoS-region-allocation processes until a convergence point is achieved.

21. A method as claimed in claim 19 wherein said QoS-region-allocation process assigns data sections having higher encoding rates to QoS regions having lower bit-error-rates.

22. A method as claimed in claim 19 wherein said grouping activity groups said subchannels into said F QoS regions in response to a cost relationship between transmission rate and transmission power.

* * * * *